(12) United States Patent
Jiang et al.

(10) Patent No.: US 11,991,441 B2
(45) Date of Patent: May 21, 2024

(54) CONTROL METHOD, ELECTRONIC DEVICE, COMPUTER-READABLE STORAGE MEDIUM, AND CHIP

(71) Applicant: Honor Device Co., Ltd., Shenzhen (CN)

(72) Inventors: Dongsheng Jiang, Shenzhen (CN); Mingliang Du, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 160 days.

(21) Appl. No.: 17/757,673

(22) PCT Filed: Dec. 16, 2020

(86) PCT No.: PCT/CN2020/136645
§ 371 (c)(1),
(2) Date: Jun. 17, 2022

(87) PCT Pub. No.: WO2021/121236
PCT Pub. Date: Jun. 24, 2021

(65) Prior Publication Data
US 2023/0022153 A1    Jan. 26, 2023

(30) Foreign Application Priority Data
Dec. 18, 2019   (CN) .......................... 201911310883.5

(51) Int. Cl.
*H04N 23/661*   (2023.01)
*H04N 23/80*    (2023.01)
*H04N 23/90*    (2023.01)

(52) U.S. Cl.
CPC .......... *H04N 23/661* (2023.01); *H04N 23/80* (2023.01); *H04N 23/90* (2023.01)

(58) Field of Classification Search
CPC ...... H04N 23/661; H04N 23/80; H04N 23/90; H04N 23/667; H04N 23/95; Y02D 30/70
See application file for complete search history.

(56) References Cited

U.S. PATENT DOCUMENTS 6,809,760 B1   10/2004   Takagi et al.
9,357,119 B2    5/2016   Hideaki et al.
(Continued)

FOREIGN PATENT DOCUMENTS

CN    103329518 A    9/2013
CN    103841322 A    6/2014
(Continued)

*Primary Examiner* — Christopher K Peterson
(74) *Attorney, Agent, or Firm* — Slater Matsil, LLP

(57) ABSTRACT

A method includes: obtaining, by a first electronic device, a photographing instruction; determining location information of to-be-photographed content corresponding to the photographing instruction or a photographing mode according to the photographing instruction, and determining, a camera at the most suitable location for photographing the to-be-photographed content from at least two cameras controllable by the first electronic device as a target camera, where the at least two cameras include a camera on the first electronic device and a camera of a second electronic device, and the first electronic device is different from the second electronic device; and controlling, by the first electronic device, the target camera to execute the photographing instruction to obtain image data acquired by the target camera.

20 Claims, 8 Drawing Sheets

(56) References Cited

U.S. PATENT DOCUMENTS

| | | |
|---|---|---|
| 9,497,380 B1 | 11/2016 | Jannard et al. |
| 9,560,321 B2 | 1/2017 | Takeshi et al. |
| 9,648,218 B2 | 5/2017 | Zhang et al. |
| 10,237,493 B2 | 3/2019 | Tomohiro et al. |
| 10,298,828 B2 | 5/2019 | Hayashi et al. |
| 10,356,183 B2 | 7/2019 | Youji et al. |
| 11,128,802 B2 | 9/2021 | Guilin |
| 2002/0052708 A1 | 5/2002 | Pollard et al. |
| 2006/0280496 A1* | 12/2006 | Tanoue ............... H04N 1/00129 386/E5.072 |
| 2008/0070623 A1 | 3/2008 | Ogawa |
| 2013/0278774 A1 | 10/2013 | Fujimatsu et al. |
| 2015/0029350 A1 | 1/2015 | Matsuda et al. |
| 2015/0092099 A1 | 4/2015 | Huiliang et al. |
| 2016/0014322 A1 | 1/2016 | Kimura |
| 2016/0142703 A1 | 5/2016 | Ken-Hyung et al. |
| 2017/0064182 A1 | 3/2017 | Gao et al. |
| 2017/0180626 A1* | 6/2017 | Hayashi ............... H04N 23/661 |
| 2017/0201672 A1 | 7/2017 | Hayashi et al. |
| 2017/0208239 A1 | 7/2017 | How-Wen et al. |
| 2019/0089886 A1 | 3/2019 | Hattori et al. |
| 2019/0191074 A1* | 6/2019 | Ikeda ............... H04N 23/65 |

FOREIGN PATENT DOCUMENTS

| | | |
|---|---|---|
| CN | 104349054 A | 2/2015 |
| CN | 104427228 A | 3/2015 |
| CN | 105611167 A | 5/2016 |
| CN | 106060406 A | 10/2016 |
| CN | 106506957 A | 3/2017 |
| CN | 106688227 A | 5/2017 |
| CN | 106850964 A | 6/2017 |
| CN | 107111664 A | 8/2017 |
| CN | 108322670 A | 7/2018 |
| CN | 108712609 A | 10/2018 |
| CN | 108803683 A | 11/2018 |
| CN | 109121194 A | 1/2019 |
| CN | 109274824 A | 1/2019 |
| CN | 109919116 A | 6/2019 |
| CN | 110177216 A | 8/2019 |
| CN | 110198421 A | 9/2019 |
| CN | 110248094 A | 9/2019 |
| CN | 110267009 A | 9/2019 |
| CN | 110445966 A | 11/2019 |
| CN | 110505411 A | 11/2019 |
| CN | 111083364 A | 4/2020 |
| JP | 2004128646 A | 4/2004 |
| JP | 2007312113 A | 11/2007 |
| JP | 2015226321 A | 12/2015 |
| RU | 2649862 C2 | 4/2018 |
| WO | 2019020052 A1 | 1/2019 |

\* cited by examiner

CONTROL METHOD, ELECTRONIC DEVICE, COMPUTER-READABLE STORAGE MEDIUM, AND CHIP

CROSS-REFERENCE TO RELATED APPLICATIONS

This application is a National Stage of International Application No. PCT/CN2020/136645, filed Dec. 16, 2020, which claims priority to Chinese Patent Application No. 201911310883.5 filed Dec. 18, 2019, both of which are hereby incorporated by reference in their entireties.

TECHNICAL FIELD

This application relates to the field of Internet of Things, and in particular, to a control method, an electronic device, a computer-readable storage medium, and a chip.

BACKGROUND

At present, various terminal devices we use, for example, mobile phones, tablet computers, surveillance cameras, TVs, vehicle consoles, and glasses, can only be controlled individually based on manual selection by users, or remotely controlled by using mobile phones connected to cameras or smart home products.

In the related art, many electronic devices include cameras, and users may manually select mobile phones, tablet computers, and surveillance cameras to photograph and acquire photos or videos. However, due to limitation of an angle and a distance of the user, there is a technical problem of low photographing quality in some scenarios.

SUMMARY

This application provides a control method, an electronic device, a computer-readable storage medium, and a chip, to perform collaborative photographing through a camera of a second electronic device, thereby improving the photographing quality.

According to a first aspect, an embodiment of the present invention provides a control method, including:

obtaining, by a first electronic device, a photographing instruction;

determining location information of to-be-photographed content corresponding to the photographing instruction according to the photographing instruction, and determining, based on the location information of the to-be-photographed content, a camera at the most suitable location for photographing the to-be-photographed content from at least two cameras controllable by the first electronic device as a target camera; and/or determining a photographing mode based on the to-be-photographed content and according to the photographing instruction, and determining a camera including the photographing mode from at least two cameras controllable by the first electronic device as a target camera, where the at least two cameras include a camera on the first electronic device and a camera of a second electronic device, and the first electronic device is different from the second electronic device; and controlling, by the first electronic device, the target camera to execute the photographing instruction to obtain image data acquired by the target camera.

Optionally, the determining, based on the location information of the to-be-photographed content, a camera at the most suitable location for photographing the to-be-photographed content from at least two cameras controllable by the first electronic device as a target camera includes:

determining, based on the location information of the to-be-photographed content, a camera whose photographing range covers the location information from at least two cameras controllable by the first electronic device, and if only one camera is determined, determining the camera as the target camera;

or determining the photographing mode based on the to-be-photographed content, determining a camera including the photographing mode from at least two cameras controllable by the first electronic device, and if only one camera is determined, determining the camera as the target camera.

Optionally, the determining, based on the location information of the to-be-photographed content, a camera at the most suitable location for photographing the to-be-photographed content from at least two cameras controllable by the first electronic device as a target camera includes:

determining, based on the location information of the to-be-photographed content, a camera whose photographing range covers the location information from the at least two cameras controllable by the first electronic device, and if a plurality of cameras are determined, controlling the plurality of cameras to acquire photos, to obtain at least two photos; and scoring the at least two photos according to a first preset rule, and determining a camera corresponding to a photo with a highest score as the target camera; or determining the photographing mode based on the to-be-photographed content, determining a camera including the photographing mode from the at least two cameras controllable by the first electronic device, and if a plurality of cameras are determined, controlling the plurality of cameras to acquire photos, to obtain at least two photos; and scoring the at least two photos according to a first preset rule, and determining a camera corresponding to a photo with a highest score as the target camera.

Optionally, the controlling, by the first electronic device, the target camera to execute the photographing instruction to obtain image data acquired by the target camera includes:

sending, by the first electronic device, a photographing request to an electronic device where the target camera is located, and receiving the image data sent by the electronic device where the target camera is located; or invoking, by the first electronic device, the target camera as a virtual camera of the first electronic device, and obtaining the image data acquired by the virtual camera.

Optionally, the first preset rule includes:

at least one of a performance parameter of a camera, a distance between a camera and to-be-photographed content, or an angle between a camera and to-be-photographed content.

Optionally, before the invoking, by the first electronic device, the target camera as a virtual camera of the first electronic device, the method further includes: virtualizing, by the first electronic device, the camera of the second electronic device as the virtual camera by using a distributed device virtualization module MSDP of the first electronic device; and the invoking, by the first electronic device, the target camera as a virtual camera of the first electronic device, and obtaining the image data acquired by the virtual camera further includes:

invoking, by the first electronic device, a CaaS function, the CaaS function being invoked by the first electronic device through a CaaS service; and querying, by the CaaS service, the MSDP whether the virtual camera exists, and when the virtual camera exists, obtaining, through a camera interface, the image data acquired by the virtual camera.

According to a second aspect, an embodiment of the present invention provides an electronic device, including:
one or more processors;
a memory;
a plurality of applications; and
one or more computer programs, where the one or more computer programs are stored in the memory, the one or more computer programs include instructions, and when the instructions are executed by the first electronic device, the first electronic device performs the method according to any embodiment of the present invention.

According to a third aspect, an embodiment of the present invention provides an electronic device, including:
a first obtaining module, configured to obtain a photographing instruction;
a first determining module, configured to determine location information of to-be-photographed content corresponding to the photographing instruction according to the photographing instruction, and determine, based on the location information of the to-be-photographed content, a camera at the most suitable location for photographing the to-be-photographed content from at least two cameras controllable by the first electronic device as a target camera; and/or
determine a photographing mode based on the to-be-photographed content and according to the photographing instruction, and determine a camera including the photographing mode from at least two cameras controllable by the first electronic device as a target camera, where the at least two cameras include a camera on the first electronic device and a camera of a second electronic device, and the first electronic device is different from the second electronic device; and
a control module, configured to control the target camera to execute the photographing instruction to obtain image data acquired by the target camera.

According to a fourth aspect, an embodiment of the present invention provides a control method, including:
obtaining, by a first electronic device, a photographing instruction;
controlling, by the first electronic device in response to the photographing instruction, at least two cameras controllable by the first electronic device to execute the photographing instruction to obtain image data acquired by the target cameras, to obtain at least two photos, where the at least two cameras include a camera on the first electronic device and a camera of a second electronic device, and the first electronic device is different from the second electronic device;
calculating a score for each photo according to at least one of a distance between a camera that acquires each photo and a to-be-photographed object, an angle of a face, or an aesthetic composition parameter; and
using a photo that meets a preset score as a photographing result of the photographing instruction; and/or when the photographing instruction is a video acquisition instruction, perform video acquisition by using a camera corresponding to a photo that meets a preset score.

Optionally, in a case that a photo includes a character, a score of the photo is calculated by the following formula:

$$E=\alpha x+\beta y+\gamma z, \text{ where}$$

E represents the score of the photo;
a distance parameter x uses a best photographing distance of 50 cm in a physical distance as a maximum value, a gradient of which decreases towards the farther or nearer, and α represents a weight value of the distance parameter x and has a value range of [0, 1];
an angle parameter y uses an angle facing a camera as a maximum value, a deflection gradient of which to a three-axis angle decreases, and β represents a weight value of the angle parameter y and has a value range of [0, 1]; and
an aesthetic composition parameter z uses a maximum score of an aesthetic composition scoring model as a maximum value, a gradient of which decreases, and γ represents a weight value of the aesthetic composition parameter z and has a value range of [0, 1].

Optionally, in a case that a photo does not include a user, a score of the photo is calculated by the following formula:

$$E=\alpha x+\beta y+\gamma z, \text{ where}$$

E represents the score of the photo;
a distance parameter x uses a best photographing distance of 50 cm in a physical distance as a maximum value, a gradient of which decreases towards the farther or nearer, and α represents a weight value of the distance parameter x and has a value range of [0, 1]; and
an aesthetic composition parameter z uses a maximum score of an aesthetic composition scoring model as a maximum value, a gradient of which decreases, and γ represents a weight value of the aesthetic composition parameter z and has a value range of [0, 1].

According to a fifth aspect, an embodiment of the present invention provides an electronic device, including: one or more processors;
a memory;
a plurality of applications; and
one or more computer programs, where the one or more computer programs are stored in the memory, the one or more computer programs include instructions, and when the instructions are executed by the first electronic device, the first electronic device performs the method according to any embodiment of the present invention.

According to a sixth aspect, an embodiment of the present invention provides an electronic device, including:
an obtaining module, configured to obtain a photographing instruction;
a response module, configured to control, by the first electronic device in response to the photographing instruction, at least two cameras controllable by the first electronic device to execute the photographing instruction to obtain image data acquired by the target cameras, to obtain at least two photos, where the at least two cameras include a camera on the first electronic device and a camera of a second electronic device, and the first electronic device is different from the second electronic device;
a scoring module, configured to calculate a score for each photo according to at least one of a distance between a camera that acquires each photo and a to-be-photographed object, an angle of a face, or an aesthetic composition parameter; and
a determining module, configured to use a photo that meets a preset score as a photographing result of the photographing instruction; and/or when the photographing instruction is a video acquisition instruction, perform video acquisition by using a camera corresponding to a photo that meets a preset score.

According to a seventh aspect, an embodiment of the present invention provides a computer-readable storage medium, including instructions, where the instructions, when run on an electronic device, cause the electronic device to perform the method according to any embodiment of the present invention.

According to an eighth aspect, an embodiment of the present invention provides a computer program product, including software code, where the software code is configured to perform the method according to any embodiment of the present invention.

According to a ninth aspect, an embodiment of the present invention provides a chip including instructions, where the chip, when run on an electronic device, causes the electronic device to perform the method according to any embodiment of the present invention.

In the embodiments of the present invention, after obtaining the photographing instruction, the first electronic device may determine, based on the location information of the to-be-photographed content, the camera at the most suitable location for photographing the to-be-photographed content from at least two cameras controllable by the first electronic device as the target camera; or determine the photographing mode based on the to-be-photographed content, and determine the camera including the photographing mode from at least two cameras controllable by the first electronic device as the target camera, thereby controlling the target camera to execute the photographing instruction. The target cameras may be cameras on at least two electronic devices, so that different cameras can be selected based on the location information of the to-be-photographed content and the photographing mode, not limited to the camera of the first electronic device, thereby achieving the technical effect of improving the quality of the acquired image data.

DETAILED DESCRIPTION OF ILLUSTRATIVE EMBODIMENTS

The technical solutions in the embodiments of this application are described below with reference to the accompanying drawings in the embodiments of this application. In the descriptions of the embodiments of this application, "/" means "or" unless otherwise specified. For example, A/B may represent A or B. "And/or" used herein describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the quantity of indicated technical features. Therefore, a feature defined by "first" or "second" can explicitly or implicitly includes one or more features. In the description of the embodiments of this application, unless otherwise stated, "a plurality of" means two or more.

Application scenarios involved in the embodiments of this application are described below. An electronic device is equipped with devices such as a camera, a microphone, a global positioning system (global positioning system, GPS) chip, various sensors (for example, a magnetic field sensor, a gravity sensor, and a gyroscope sensor), to sense an external environment and user actions. According to the sensed external environment and user actions, the electronic device provides the user with personalized and contextualized service experience. The camera can obtain rich and accurate information, so that the electronic device can sense the external environment and the user actions. An embodiment of this application provides an electronic device. The electronic device may be implemented as any of the following devices including a camera: a mobile phone, a tablet computer (pad), a portable game console, a personal digital assistant (personal digital assistant, PDA), a notebook computer, an ultra mobile personal computer (ultra mobile personal computer, UMPC), handheld computer, a netbook, an in-vehicle media player, a wearable electronic device, a virtual reality (virtual reality, VR) terminal device, an augmented reality (augmented reality, AR) terminal device, or other digital display products.

First, an exemplary electronic device 100 provided in the following embodiment of this application is described.

Figure 1:
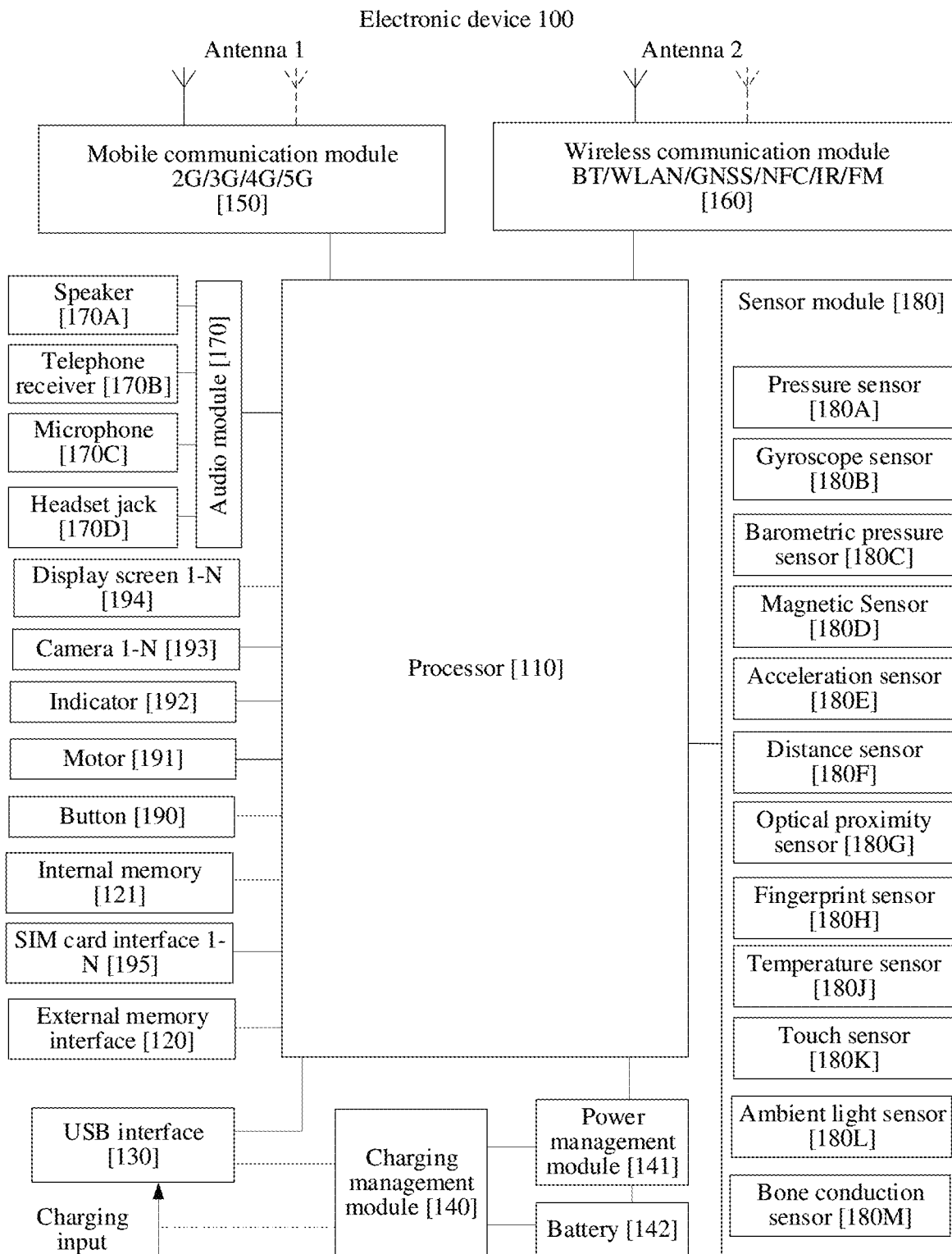
FIG. 1 is a structural diagram of an electronic device according to an embodiment of the present invention.

FIG. 1 is a schematic structural diagram of the electronic device 100.

This embodiment is described in detail below by using the electronic device 100 as an example. It should be understood that the electronic device 100 shown in FIG. 1 is only an example, and the electronic device 100 may have more or fewer components than those shown in FIG. 1, may combine two or more components, or may have a different component configuration. The components shown in the figure may be implemented in hardware, software, or a combination of hardware and software that includes one or more signal processing and/or application-specific integrated circuits.

The electronic device 100 may include a processor 11o, an external memory interface 120, an internal memory 121, a universal serial bus (universal serial bus, USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor module 180, a key 190, a motor 191, an indicator 192, a camera 193, a display screen 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment of the present invention constitutes no specific limitation on the electronic device 100. In some other embodiments of this application, the electronic device 100 may include more or fewer components than those shown in the figure, or some components may be combined, or some components may be divided, or different component arrangements may be used. The components in the figure may be implemented by hardware, software, or a combination of software and hardware. For a detailed structural description of the electronic device 100, refer to the prior patent application: CN201910430270.9.

Figure 2:
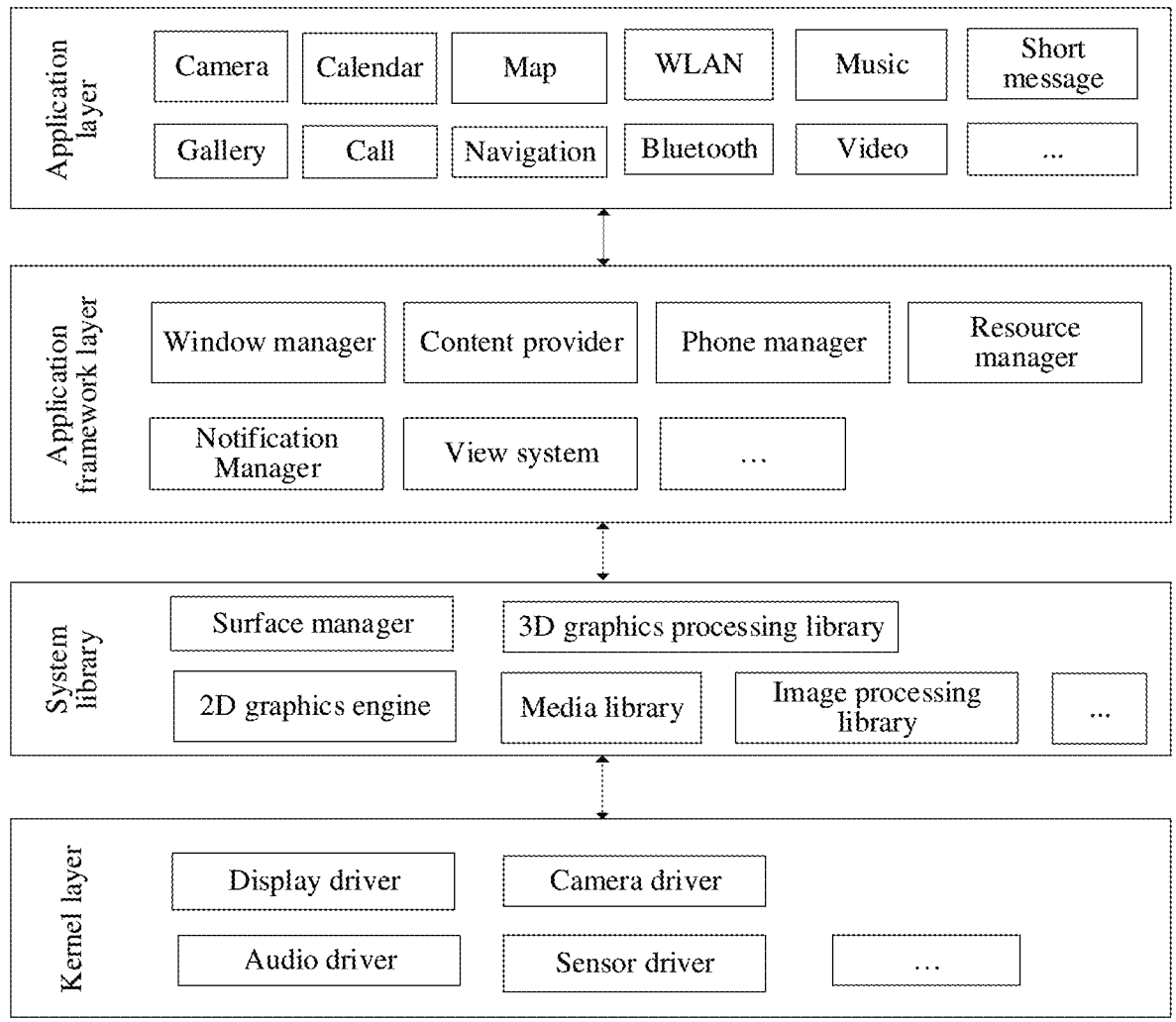
FIG. 2 is a framework diagram of software of an electronic device according to an embodiment of the present invention.

FIG. 2 is a block diagram of a software structure of an electronic device 100 according to an embodiment of this application. In a layered architecture, software is divided into several layers, and each layer has a clear role and task. Layers communicate with each other through a software interface. In some embodiments, the Android system is divided into four layers that are respectively an application layer, an application framework layer, an Android runtime and system library, and a kernel layer from top to bottom. The application layer may include a series of application packages. For a detailed description of functions of the software, refer to the prior patent application: CN201910430270.9.

An embodiment of the present invention provides a control method, which may be applied to image photographing and video photographing. The method is applied to an electronic device 100. The electronic device 100 is configured to invoke capabilities of other electronic devices associated with the electronic device, especially camera functions, to use the camera functions of other electronic devices to acquire images. Other electronic devices are, for example, electronic devices bound with the same account as the electronic device 100, electronic devices in the same local area network as the electronic device 100, electronic devices belonging to the same user as the electronic device 100, electronic devices (for example, when the user of the electronic device 100 is the mother in the family, other electronic devices include electronic devices of the mother, the fathers, and the children) belonging to the same household as the electronic device 100, and other electronic devices that can be controlled by the electronic device 100, which are not listed in detail and not limited in this embodiment of the present invention. For example, if each electronic device is willing to share a function (for example, a camera), the electronic device may be registered in the cloud, and the cloud records the electronic device with a sharing function (for example, a shared camera, a microphone, or a display screen). In this way, when the electronic device 100 needs to perform photographing, a current location and a photographing requirement are sent to the cloud, and the cloud selects a suitable electronic device for photographing and provides the electronic device to the electronic device 100.

Figure 3:
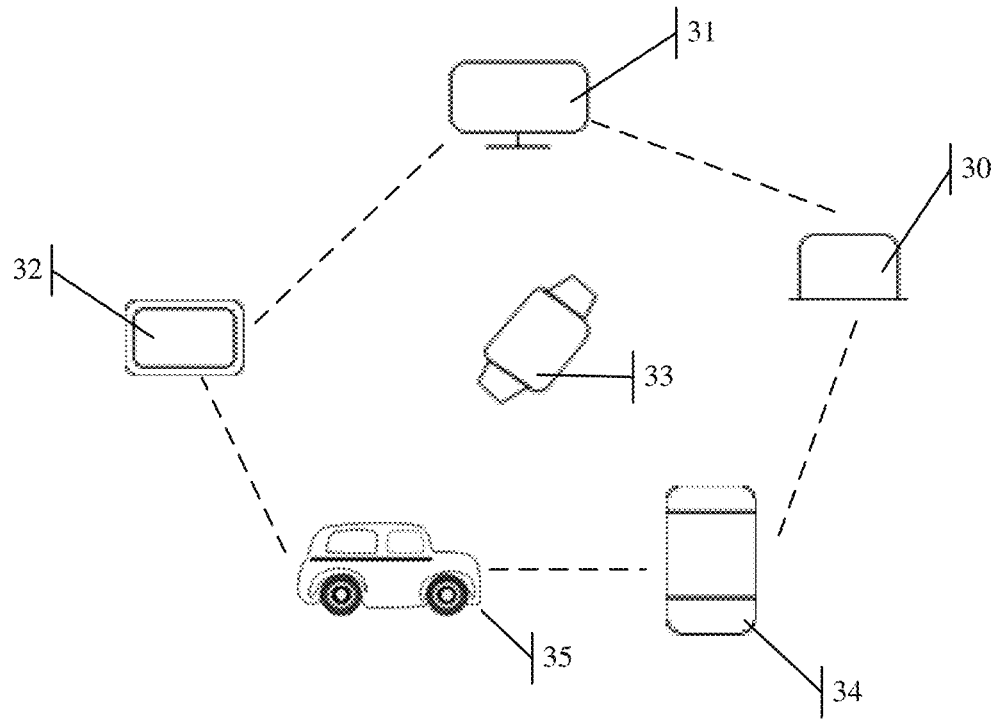
FIG. 3 is a framework diagram of a smart home system according to an embodiment of the present invention.

With the upgrade of smart home and smart life and through the Internet interconnecting things, in the future, there will be an integrated life circle where a terminal such as a mobile phone or cloud is used as a center and a variety of different terminals (for example, pads, surveillance cameras, TVs, vehicle consoles, and glasses) in the whole scenario are intelligently coordinated. The electronic device 100 may be an electronic device included in a smart home scenario. Referring to FIG. 3, the smart home scenario includes the following devices: a desktop computer 30 (including a camera, where a camera ID is 30a), a smart TV 31 (including a camera, where a camera ID is 31a), PAD32 (including a camera, where a camera ID is 32a), a smart watch 33 (including a camera, where a camera ID is 33a), a mobile phone 34 (including a front-facing camera and a rear-facing camera, where a front-facing camera ID is 34a, and a rear-facing camera ID is 34b), a car 35 (including five cameras, where camera IDs are 35a, 35b, 35c, 35d, and 35e).

The electronic device 100 is, for example, the mobile phone 34. The smart home scenario may further include other devices. The electronic device 100 may alternatively be another device in the smart home scenario, usually an electronic device with a relatively strong computing capability in the smart home scenario. The electronic device 100 may be identified as a main control device, and an electronic device whose capability (for example, a camera, a microphone, or a display) is registered with the main control device (the electronic device 100) may be identified as a controlled device. The control method provided in the embodiments of the present invention may alternatively be applied to the cloud. When the electronic device needs to photograph a photo or a video, for example, after the user generates a photographing instruction, the photographing instruction is sent to the cloud, and the cloud selects, based on the capabilities of the electronic devices, the most suitable electronic device for photographing.

Figure 4:
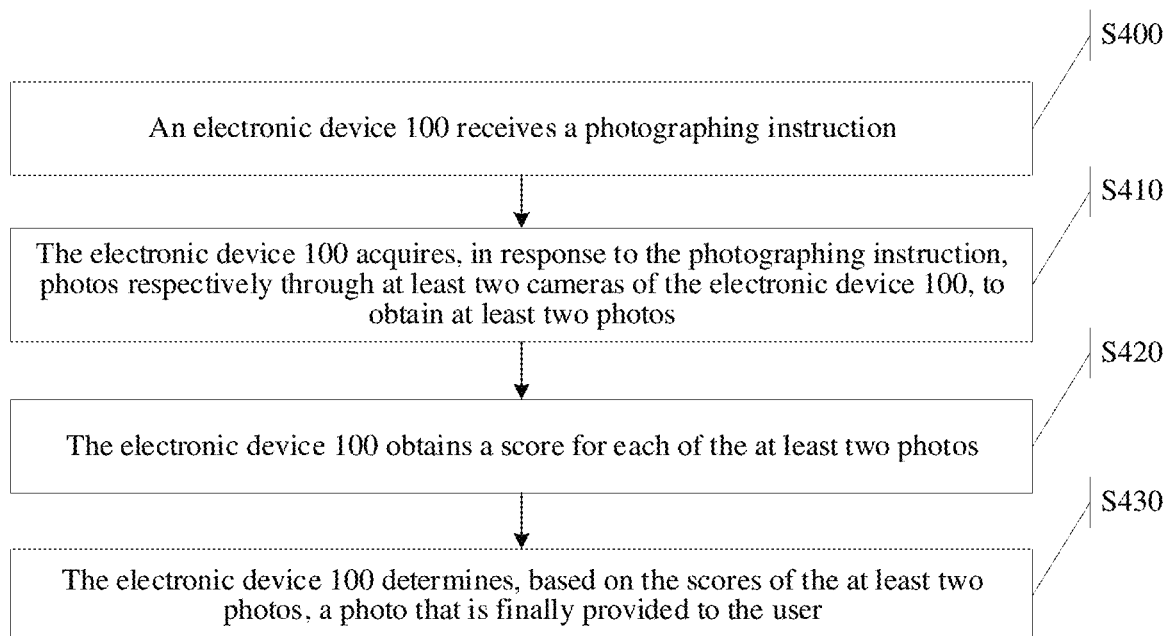
FIG. 4 is a flowchart of a control method according to an embodiment of the present invention.

A control method is described below by using the electronic device 100 as an example. Referring to FIG. 4, the method includes the following steps:

S400: An electronic device 100 receives a photographing instruction.

The photographing instruction is, for example, an instruction to photograph a photo, and the photographing instruction may be a voice instruction, an instruction to trigger a photographing button of a photographing application, a preset gesture, or the like. For example, the user of the electronic device 100 may issue a voice instruction to the electronic device 100. The voice instruction is, for example, "take a picture of me", or "take a picture of the inside of the car". The user may issue the voice instruction when the screen of the electronic device 100 is in a locked state, or may issue the voice instruction after the electronic device 100 is unlocked. The electronic device 100 can respond to the voice instruction in both cases. Alternatively, the user may start a camera application of the electronic device 100, and issue the photographing instruction through the camera application. Alternatively, the user may start an instant messaging application, and trigger the photographing instruction by clicking a camera button of the instant messaging application, or trigger the photographing instruction by clicking a video communication button of the instant messaging application, or the like. Certainly, the photographing instruction may alternatively be generated in other manners, which are not listed in detail and not limited in this embodiment of the present invention. The electronic device 100 is, for example, the mobile phone 34 shown in FIG. 3. In this embodiment, that the user performs photographing through the photographing button of the camera application is described as an example. In an optional embodiment, the photographing instruction is issued by the user of the electronic device 100. For example, a user A picks up the mobile phone 34 and says "take a picture of the inside of the car". The electronic device 100 then directly acquires the photographing instruction. In another example, the user A picks up the mobile phone 34, opens a vehicle surveillance application, and triggers a remote photographing function; and the vehicle surveillance application of the electronic device 100 then generates a photographing instruction based on a user operation, or the like. In another optional embodiment, the electronic device 100 receives a photographing instruction sent by another electronic device. For example, the user sends a voice instruction "take a picture of the kitchen for me" to an in-vehicle navigator. After receiving the photographing instruction, the in-vehicle navigator sends the photographing instruction to the electronic device 100, so that the photographing instruction is executed based on the strong computing function of the electronic device 100.

Alternatively, after detecting the photographing instruction, the in-vehicle navigator first determines whether the in-vehicle navigator has a capability of processing the photographing instruction. If the in-vehicle navigator has the capability of processing the photographing instruction, the in-vehicle navigator processes the photographing instruction; otherwise the in-vehicle navigator sends the photographing instruction to the electronic device 100.

For example, when detecting the photographing instruction, the in-vehicle navigator may determine whether the in-vehicle navigator can respond to the photographing instruction, and obtain a photo or video corresponding to the photographing instruction. If the in-vehicle navigator can respond to the photographing instruction, it may be considered that to the in-vehicle navigator has the capability of processing the photographing instruction; otherwise, it is considered that the in-vehicle navigator has no capability of processing the photographing instruction.

S410: The electronic device 100 acquires, in response to the photographing instruction, photos respectively through at least two cameras of the electronic device 100, to obtain at least two photos, where the at least two cameras of the electronic device 100 include at least one of a physical camera or a virtual camera, there may be one or more physical cameras, and there may be one or more virtual cameras.

In an optional implementation, the at least two cameras of the electronic device 100 include both a physical camera and a virtual camera, so that the electronic device 100 can respond to the photographing instruction simultaneously through the cameras of the electronic device 100 and a camera of the another electronic device.

In a specific implementation process, the physical camera of the electronic device 100 is a built-in camera of the electronic device 100, such as a front-facing camera or a rear-facing camera of the electronic device 100. The virtual camera of the electronic device 100 is a camera virtualized from another electronic device by the electronic device 100. The electronic device 100 may trigger an operation of registering a virtual camera in many cases. Two cases are listed below for description. In a specific implementation process, the present invention is not limited to the following two cases. Using a smart home system shown in FIG. 3 as an example, the mobile phone 34 has two physical cameras (a front-facing camera and a rear-facing camera, where an ID of the front-facing camera is 34*a*, and an ID of the rear-facing camera is 34*b*) and nine virtual cameras (whose camera IDs are respectively 30*a*, 31*a*, 32*a*, 33*a*, 35*a*, 35*b*, 35*c*, 35*d*, and 35*e*).

Before invoking a function of the virtual camera, the electronic device 100 first needs to register data (an image or a video) acquired by the camera of the another electronic device as a virtual camera. The electronic device 100 may register the camera of the another electronic device as the virtual camera in many cases, and two cases are listed below for description. Certainly, in a specific implementation process, the present invention is not limited to the following two cases.

In the first case, after the electronic device 100 (used as the main control device) is powered on (or is connected to a router or enables a Bluetooth function), the electronic device 100 sends broadcast information through short-range communication (for example, Bluetooth or WI-FI) to search for other electronic devices in a communication range, and device information is sent to the electronic device 100. The device information includes, for example, a device capability (a camera, a microphone, a display, or the like), a device location, or a device ID (identity document: identification code). If the electronic device 100 wishes to register a camera of a corresponding electronic device as a virtual camera, the electronic device 100 sends request information to the corresponding electronic device. If the corresponding electronic device agrees to use the camera as the virtual camera of the electronic device 100, the electronic device generates confirmation information (for example, clicks a preset button, generates a preset voice instruction, or generates a voice gesture). After receiving the confirmation information, the electronic device 100 performs a virtualization operation of virtualizing the camera of the corresponding electronic device as a local camera. Similarly, the electronic device 100 may alternatively virtualize another capability (for example, a microphone or a display) of the another electronic device as a local device.

After the another electronic device is powered on (or connected to the router), broadcast information may also be generated to search for the main control device (the electronic device 100). After the electronic device 100 is found, the electronic device 100 virtualizes the camera of the another electronic device as a camera of the electronic device 100. Similarly, the electronic device 100 may further virtualize other capabilities of the another electronic device as capabilities of the electronic device 100.

In the second case, after being registered to a server through an account, the electronic device 100 may search for another electronic device registered with the same account as the electronic device 100, register a camera of the other electronic device as a camera of the electronic device 100, and may further register another capability of the another electronic device as a capability of the electronic device 100. After the another electronic device (the controlled device) is registered to the server through an account, the another electronic device may also search for the main control device registered with the same account as the another electronic device, and register a function thereof to the main control device.

In a specific implementation process, the camera is registered as a virtual camera of the system, so that the electronic device 100 can invoke data acquired by the camera of the another electronic device. The electronic device 100 can invoke other capabilities of the another electronic device in a similar manner.

Figure 5:
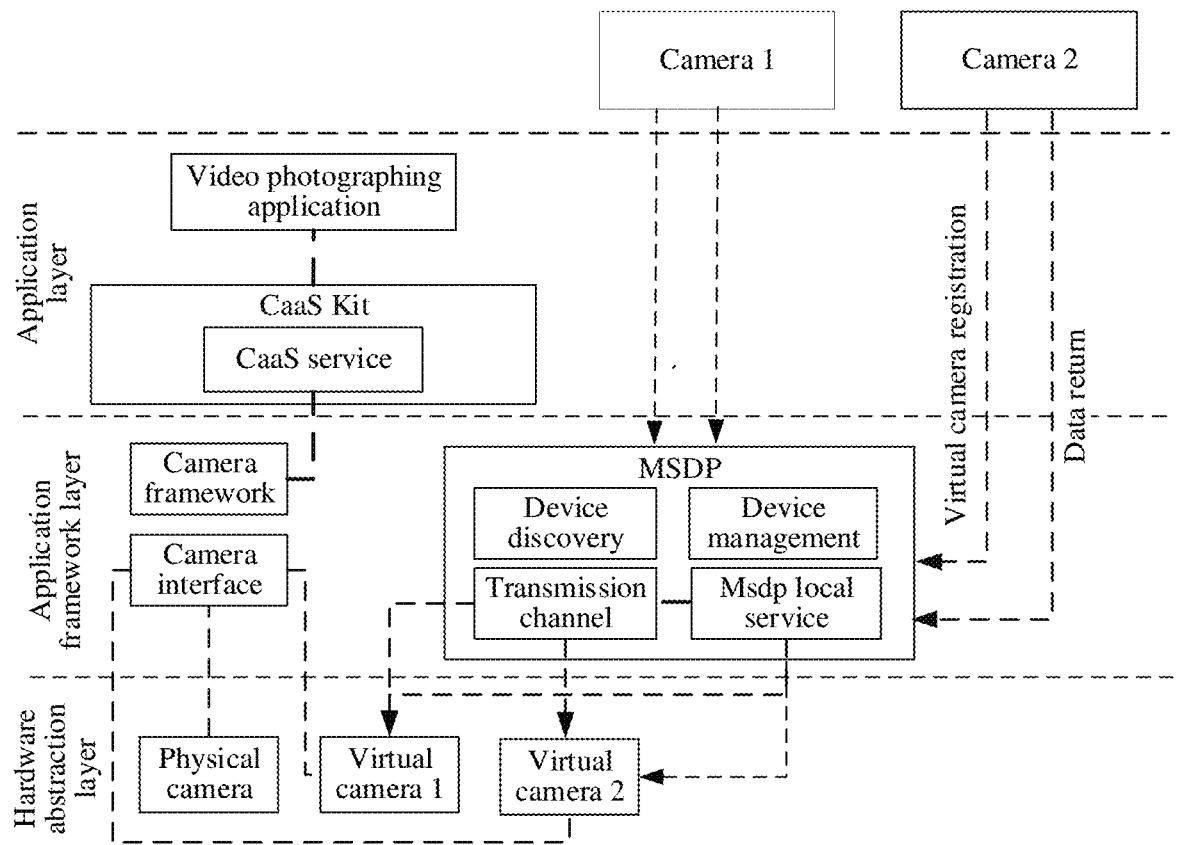
FIG. 5 is a framework diagram of software that virtualizes a camera of another electronic device as a camera of an electronic device 100 according to an embodiment of the present invention.

Referring to FIG. 5, a software architecture for implementing the solution includes:

The electronic device 100 may invoke a CaaS function (for example, CaaS Kit). CaaS (Communications-as-a-Service: Communications as a Service) refers to encapsulating Internet-based communication capabilities such as messaging, voice, video, conference, and communication collaboration into API (Application Programming Interface, application programming interface) or SDK (Software Development Kit, software development kit), which are open to the public and provided for third parties to invoke. The CaaS function includes a lot of content such as call signaling, media transmission, and CaaS services. The CaaS function is invoked by the electronic device 100 through a CaaS service. When a trigger condition is satisfied, the electronic device 100 first informs an MSDP (Mobile Sensing development platform: mobile sensing platform) to register a camera of another electronic device as a virtual camera of a hardware abstraction layer.

An application framework layer includes: a camera framework, configured to provide a camera function to the outside world. A camera interface is configured to obtain data acquired by cameras. The MSDP is configured to register a virtual camera, that is, virtualize a camera of another electronic device as a virtual camera of the hardware abstraction layer.

The hardware abstraction layer includes cameras (physical cameras and virtual cameras). Through a camera interface, not only physical cameras (for example, data of a front-facing camera and data of a rear-facing camera) of the electronic device 100 can be accessed, and also virtual cameras can be accessed. The hardware abstraction layer is located between the system library and the kernel layer in the software system framework shown in FIG. 2.

When the electronic device 100 needs to invoke a camera function of CaaS, the electronic device first registers a CaaS service with the system. The CaaS service queries the MSDP whether a virtual camera exists, and when the virtual camera exists, obtains, through a camera interface, video data of the virtual camera. The virtual camera and the physical camera have different tags, so that the CaaS service can accurately obtain the video data of the virtual camera based on a tag of the virtual camera. Certainly, other capabilities may be provided for the electronic device in a similar manner, which is not limited in this embodiment of the present invention.

When a camera of another electronic device is registered as a virtual camera of the electronic device 100, some information about the virtual camera may be recorded, for example, location information, functions (for example, a photographing mode, whether the camera is zoomed, and a resolution of the camera), and on which electronic device the camera is located. In addition, each camera has a camera ID, which is used for the electronic device 100 to identify the identity of the camera.

In a specific implementation process, the electronic device 100 may control all cameras thereof to perform photographing, or may control some cameras thereof to perform photographing. The electronic device may select a target camera from all the cameras thereof in various manners. Two manners are listed below for description. Certainly, in a specific implementation process, the present invention is not limited to the following two cases.

In the first case, after obtaining the photographing instruction, the electronic device 100 may first determine location information of to-be-photographed content corresponding to the photographing instruction, and then determine a camera for photographing based on the location information. For example, the user is worried that the window of the car is not closed or a thief has entered the car, so that the user wants to check the situation in the car, and the following photographing instruction is generated "check the situation in the car". After obtaining the photographing instruction, the electronic device 100 determines that the to-be-photographed content is located in the car through semantic analysis. In this case, the electronic device 100 invokes cameras located in the car among the cameras (the physical cameras and the virtual cameras), that is, the cameras 35*a*, 35*b*, 35*c*, 35*d*, and 35*e*, and then controls the cameras to perform image acquisition.

In another example, a photographing instruction is "hey, little E, take a picture for me", and the photographing instruction is received by the electronic device 100. The electronic device 100 may then determine a camera of the electronic device within a preset distance range as a camera for acquisition at present. For example, the electronic device 100 may first determine a region in which the electronic device 100 is located (for example, in a living room) through a positioning apparatus (or by acquiring and analyzing an environment image), and then determine a camera of an electronic device in the region as a camera for acquisition. For example, if electronic devices currently located in the living room include the PAD32 and the smart TV 31 (also include the electronic device 100), the electronic device 100 may determine that the cameras 32*a*, 31*a*, 34*a*, and 34*b* are cameras for acquisition.

After receiving voice information generated by the user, the electronic device may match the voice information with preset user voiceprint information, to verify the identity of the user who sends the voice information. After a pickup of the electronic device 100 acquires the voice information of the user, the voice information is transmitted to a CPU or an NPU (Neural-network Processing Unit: embedded neural network processor) through a main board for voice recognition, and is converted into a voice instruction recognizable by the electronic device 100.

Alternatively, the electronic device 100 may first obtain location information of other electronic devices through the positioning apparatus, and then use a camera of an electronic device whose distance from the electronic device 100 is within a preset distance range as a camera for acquisition. The preset distance is, for example, 10 m or 20 m, which is not limited in this embodiment of the present invention.

In the second case, the electronic device 100 may determine to-be-photographed content in the photographing instruction; determine a photographing mode based on the to-be-photographed content; and determine, based on the photographing mode, a camera including the photographing mode as a camera for acquisition.

For example, if the photographing instruction is a voice instruction, the electronic device 100 may first recognize the voice instruction, and then perform semantic analysis based on recognized content, thereby determining that the to-be-photographed content is a person, a landscape, a still life, or the like. For example, if the photographing instruction is "take a picture for me", the to-be-photographed content includes a person; if the photographing instruction is "take a picture of the bedroom", the to-be-photographed content includes a still life; if the photographing instruction is "take a picture of the scene in front of you", the to-be-photographed content is a landscape, or the like.

If the to-be-photographed content includes a "person", the photographing mode of the camera is, for example, a portrait mode or a large aperture mode. If the to-be-photographed content is a "landscape", the photographing mode of the camera is, for example, a landscape mode. If the determined photographing mode is the portrait mode, the electronic device 100 may first determine cameras with the portrait mode, and then control the cameras to perform image acquisition; and if the determined photographing mode is the landscape mode, the electronic device 100 may first determine cameras with the landscape mode, and then control the cameras to perform image acquisition, and so on. Optionally, when the electronic device 100 controls the cameras to take pictures, the photographing instruction may carry the photographing modes. For example, if the to-be-photographed content corresponding to the photographing instruction includes a "person", the photographing mode is the portrait mode. The electronic devices that receive the photographing instruction use the portrait mode to acquire photos, and send the photos to the electronic device 100. If the to-be-photographed content corresponding to the photographing instruction is a landscape, the photographing mode may be the landscape mode. The electronic devices that receive the photographing instruction use the landscape mode to acquire photos, and send the photos to the electronic device 100.

In addition, if the electronic devices that receive the photographing instruction do not have a corresponding photographing mode, a photographing mode that is closest to the corresponding photographing mode is used to take a picture, or a favorite photographing mode of the user of the electronic device 100 is used to take a picture (for example, a default photographing mode or the most frequently used photographing mode in history).

When controlling a camera to perform photographing, the electronic device 100 may further inform photographing parameters of the camera, such as a photo size, an exposure, and a photographing mode.

S420: The electronic device 100 obtains a score for each of the at least two photos.

The electronic device 100 may send the at least two photos to the server, and after the server scores the at least two photos, the scores are returned to the electronic device 100. The electronic device 100 may alternatively score the at least two photos locally, and a specific manner of obtaining the score of each photo is described subsequently.

It is assumed that the cameras used for acquisition in step S320 are 35*a*, 35*b*, 35*c*, 35*d*, and 35*e*, and scores of the acquired photos are shown in Table 1:

TABLE 1

| | Camera ID | | | | |
|---|---|---|---|---|---|
| | 35$^a$ | 35$^b$ | 35$^c$ | 35$^d$ | 35$^e$ |
| Score | 7.1 | 7.5 | 8.3 | 5.7 | 6.9 |

Certainly, based on different cases, the scores of the photos acquired by each camera are also different, and details are not described herein again.

S430: The electronic device 100 determines, based on the scores of the at least two photos, a photo that is finally provided to the user.

In a specific implementation process, the electronic device 100 may directly provide a photo with the highest score (or a photo whose score is ranked in the first preset position or is greater than a preset value) to the user. For example, the photo with the score of 8.3 in Table 1 is directly provided to the user. The electronic device 100 may alternatively determine the camera of the photo with the highest score (or a photo whose score is ranked in the first preset position or is greater than a preset value) as a camera for acquisition, and re-acquire a photo as a photo provided to the user.

When the photo is provided to the user, the photo acquired by each camera may be directly provided to the user, or the photo may be processed first through such as cropping, picture beautification (for example, skin resurfacing, face beautification, leg slimming, or red-eye removal), stitching, or special effect processing (for example, a portrait mode, a night scene mode, or a large aperture mode). The electronic device 100 may send the photo to the server for processing, may process the photo locally, or send the photo to another electronic device for processing. For example, the electronic device 100 wishes to use picture beautification software to perform picture beautification processing on the photo, but the picture beautification software is not installed on the electronic device 100, and the electronic device 100 finds that the PAD32 has the picture beautification software. The electronic device 100 may then process the photo through the PAD32 and provide the processed photo to the user.

Figure 6:
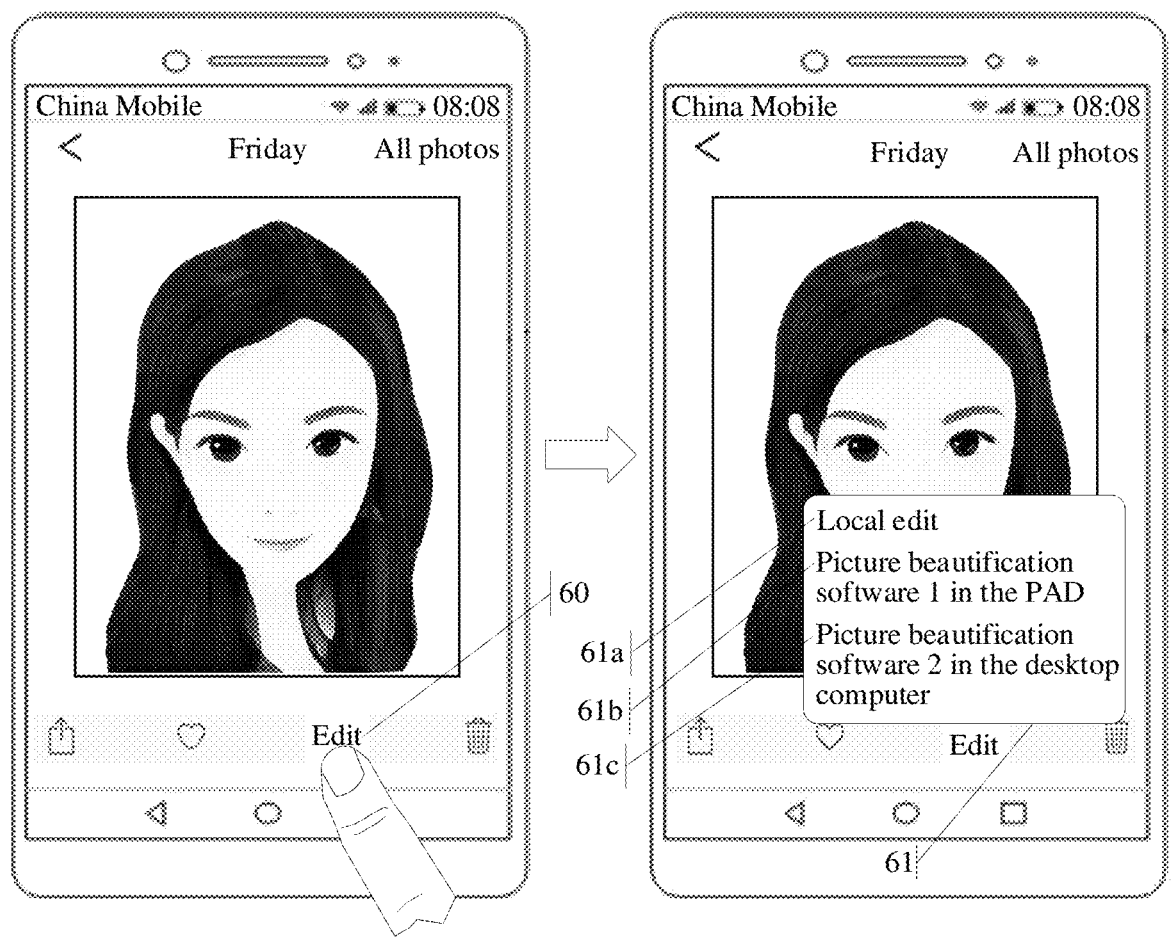
FIG. 6 is an interface interaction diagram of processing a photo according to an embodiment of the present invention.

Alternatively, after the photo is provided to the user, when the user wishes to process the photo, the electronic device 100 may prompt the user to use the picture beautification software of another electronic device to process the photo. For example, as shown in FIG. 6, the user of the electronic device 100 clicks an editing button 60 (certainly, an editing operation may alternatively be triggered in other manners). After the electronic device 100 responds to the operation, a selection menu 61 is displayed. The selection menu 61 displays a variety of editing manners for the user to select an editing manner. The editing manner may be an editing manner possessed by the electronic device 100, for example, "local editing" 61*a* shown in FIG. 6; or may be an editing manner possessed by another electronic device, for example, "picture beautification software 1 in the PAD" 61*b* shown in FIG. 6, which indicates that the photo may be processed by the picture beautification software 1 installed on the PAD, or "picture beautification software 2 in the desktop computer" 61*c*, which indicates that the photo may be processed by the picture beautification software 2 installed on the desktop computer.

When detecting that the user selects an editing manner of another electronic device to process the photo, the electronic device 100 may control the corresponding electronic device to start a corresponding application. For example, when the user selects the "picture beautification software 1 in the PAD" 61*b*, the electronic device 100 controls the PAD to control the picture beautification software 1 to be in a started state, and synchronously displays a processing interface of the picture beautification software 1 on the electronic device 1, the electronic device 100 receives a processing instruction for the photo, and sends the processing instruction to the PAD32, so that the photo of the electronic device 100 can be processed on the electronic device 100 through an image processing application of the PAD. Alternatively, when the electronic device 100 detects that the user selects an editing manner of another electronic device to process the photo, the electronic device 100 sends the photo to the corresponding electronic device, and controls the corresponding electronic device to start an application and open the photo in the application. For example, the electronic device 100 controls the picture beautification software 1 of the PAD32 to be in the started state, and opens the photo in the picture beautification software 1. The user then processes the photo on the PAD32, and sends the processed photo to the electronic device 100.

In a specific implementation process, after acquiring the photos respectively through the at least two cameras of the electronic device 100 based on S410, the electronic device 100 may further display all the photos on a display interface of the electronic device 100, and the user may select a favorite photo.

In a specific implementation process, after obtaining the at least two photos based on S310, the electronic device 100 may further stitch the at least two photos and provide a stitched photo to the user, so that the user can take pictures from a plurality of angles simultaneously.

In an embodiment, each electronic device in the smart home system may be used as a main control device, so that after receiving the photographing instruction, each electronic device may perform the foregoing steps in response to the photographing instruction. In another embodiment, some electronic devices in the smart home system are main control devices, and some other electronic devices are controlled devices. After receiving the photographing instruction, the main control devices directly respond to the photographing instruction and perform the foregoing steps. After receiving the photographing instruction, the controlled devices send the photographing instruction to the main control devices, so that the main control devices perform the foregoing steps. The smart home system shown in FIG. 3 is used as an example. The mobile phone 34 is a main control device, and the smart watch is a controlled device. After receiving the photographing instruction, the mobile phone 34 directly responds to the photographing instruction. However, after receiving the photographing instruction, the smart watch sends the photographing instruction to the mobile phone 34, and the mobile phone receives the photographing instruction. After acquiring the photo, the main control device may store the photo locally, or may send the photo to the controlled device. Before sending the photo to the controlled device, the main control device may further adjust a display size of the photo, so that the display size fits a display unit of the controlled device.

In an embodiment, the foregoing steps are performed by the electronic device 100. In another embodiment, after the electronic device 100 receives the photographing instruction, the electronic device 100 sends the photographing instruction to the server, and the server performs the steps performed by the electronic device 100 in the foregoing steps S400 to S430.

Based on the foregoing solution, photographing is not limited to the current electronic device, thereby resolving the technical problem of a poor photographing effect caused by poor angles and distances selected in photographing when only the current electronic device is used. Based on the scores of the photos photographed by the cameras, the most suitable camera can be selected for image acquisition, thereby improving the quality of the acquired photos. In addition, in this solution, the selection is made directly based on the electronic device (or the cloud server) without manual selection of the user, thereby improving the selection efficiency. In addition, in this solution, when a thin terminal (an electronic device with a weak processing capability) receives the photographing instruction, the thin terminal may send the photographing instruction to an electronic device with a strong processing capability for processing. The photographing effect of the thin terminal can be improved by means of the strong image algorithm capability and the photographing mode advantage of the electronic device with the strong processing capability, so that the thin terminal can also photograph high-quality photos.

In addition, in the foregoing solution, the electronic device 100 may further use an application installed on another electronic device to process data on the current electronic device (for example, beautify photos). Therefore, functions of various electronic devices can be used, and even when an application is not installed on the electronic device, the electronic device can still use the application.

Figure 7:
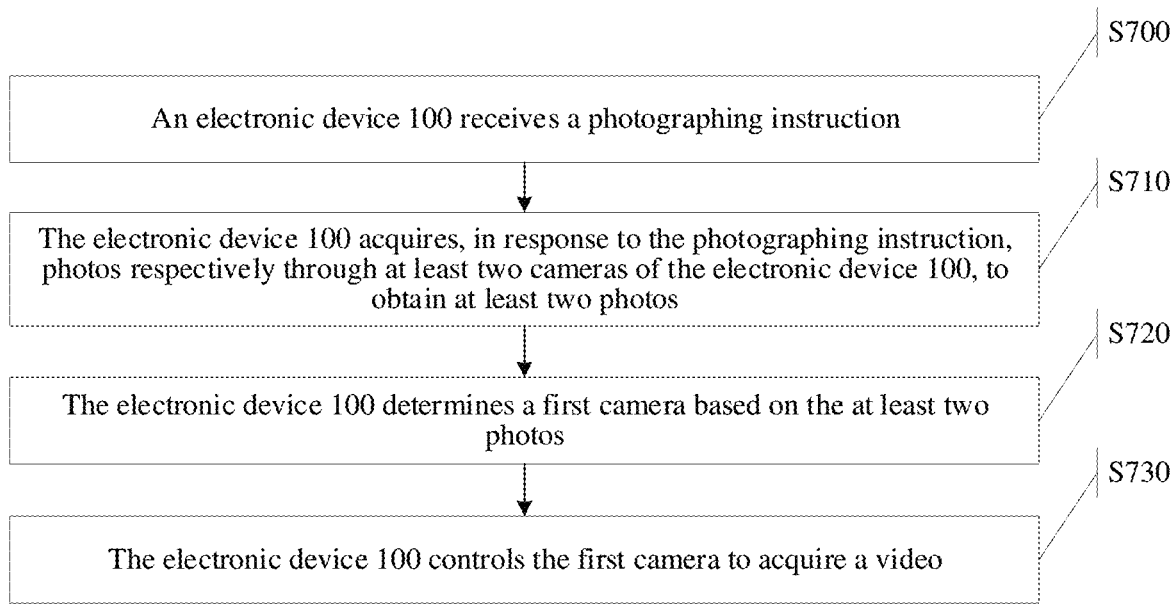
FIG. 7 is a flowchart of a control method according to an embodiment of the present invention.

Another embodiment of the present invention provides a control method. Referring to FIG. 7, the method includes the following steps:

S700: An electronic device 100 receives a photographing instruction.

The photographing instruction is, for example, a video acquisition instruction, and a manner of generating the photographing instruction is similar to that in S400, and details are not described herein again. The photographing instruction may be used for acquiring a video, or may be used for performing video communication with another electronic device. For example, the user of the electronic device 100 generates a voice instruction "photograph a video of an event for me". In this case, the electronic device 100 photographs a video through the photographing instruction. In another example, the user of the electronic device 100 starts an instant messaging application and enables a video call function. After detecting the operation, the electronic device 100 enables a camera through the photographing instruction to perform a video call with another electronic device.

S710: The electronic device 100 acquires, in response to the photographing instruction, photos respectively through at least two cameras of the electronic device 100, to obtain at least two photos, where the at least two cameras of the electronic device 100 include at least one of a physical camera or a virtual camera, there may be one or more physical cameras, and there may be one or more virtual cameras. This step is similar to S410, and details are not described herein again.

S720: The electronic device 100 determines a first camera based on the at least two photos.

For example, the electronic device 100 may obtain scores of the at least two photos, and then determine the first camera according to the scores of the at least two photos. The specific determination manner is described in S420, and details are not described herein again. The electronic device 100 may alternatively display photos acquired by all cameras on a display unit of the electronic device 100, prompt the user to select a best photo to the user, and then use a camera corresponding to the photo selected by the user as the first camera. The first camera may be one camera or a plurality of cameras. For example, a camera with the best photographing effect (with the highest score) may be selected as the first camera, or several cameras at different angles and with relatively good photographing effects (with scores greater than a preset value) may be selected as the first cameras, to photograph and obtain a plurality of videos, thereby providing the user with videos from different angles, and providing the user with more choices.

Optionally, in S710, the electronic device 100 may alternatively control the cameras to acquire videos; and in S720, the first camera may be determined by scores (an average of scores of frames of a video) of the videos or a video selected by the user.

S730: The electronic device 100 controls the first camera to acquire a video.

Similarly, after controlling the first camera to acquire the video, the electronic device 100 may directly use the video as a photographing result of the photographing instruction, or may process the video. In addition, the electronic device 100 may further process the video by means of applications included in other electronic devices, and details are not described herein again.

When controlling the first camera to perform video acquisition, the electronic device 100 may control other cameras to be in an enabled state or a disabled state, and this is not limited in this embodiment of the present invention.

In an embodiment, after determining the first camera, in this photographing process, the electronic device 100 always uses the first camera for video acquisition. In another optional embodiment, after the electronic device determines the first camera, if at least one of a location of to-be-photographed content or a location of the first camera changes, that is, the location of the to-be-photographed content changes relative to the first camera, a camera for video acquisition may be re-determined, which may be determined in various manners. Two manners are listed below for description. Certainly, in a specific implementation process, the present invention is not limited to the following two cases.

In the first case, other cameras are controlled to be always in the enabled state. Photos (or videos) are acquired through the cameras every preset time interval (for example, 10s, 20s, or 1 min). The photos (or the videos) acquired by the electronic devices and a photo (or a video) acquired by the first camera are respectively scored. If the photo acquired by the first camera still has the highest score (or still meets the conditions in S420 and S720), the first camera is still used as the camera for video acquisition. If there is a photo acquired by another camera that has a score higher than the score of the photo acquired by the first camera (or meets the conditions in S420 and S720 better than the first camera), the corresponding electronic device is set as a new camera for video acquisition.

An example in which the electronic device 100 controls the cameras 35a, 35b, 35c, 35d, and 35e for image acquisition is used for description. A camera selected by the electronic device 100 in an initial stage is the camera 35a. It is assumed that scores of acquired images are shown in Table 3:

TABLE 3

| | Electronic device | | | | |
|---|---|---|---|---|---|
| | 35$^a$ | 35$^b$ | 35$^c$ | 35$^d$ | 35$^e$ |
| Scores (after 1 min) | 6.1 | 7.5 | 8.1 | 5.5 | 5 |
| Scores (after 2 min) | 6.1 | 8.0 | 7.3 | 6 | 5 |

Since a photo acquired by the camera 35c still has the highest score after 1 min, the camera 35c is still used as the camera for video acquisition. However, after 2 min, a photo acquired by the camera 35b has the highest score. In this case, the camera 35b is used as the camera for video acquisition, and video data is acquired by the camera 35b subsequently.

If the foregoing solution is used for video acquisition, video data finally acquired by the electronic device 100 is a video acquired through at least two cameras. If the solution is used for a video call, at different moments, videos received by a peer end electronic device are videos acquired through different cameras.

In the second case, the cameras other than the first camera are controlled to be in an acquisition stop state. A motion amount of the first camera and a motion amount of the to-be-photographed content are detected every preset time interval (for example, 20s or 1 min). When the motion amount of the first camera is greater than a preset motion amount (for example, 5 m or 7 m), or the motion amount of the to-be-photographed content is greater than the preset motion amount, or a relative motion amount of the to-be-photographed content to the first camera is greater than the preset motion amount, the other cameras are controlled to be in an acquisition state to acquire photos. In addition, scores of the photos acquired by the cameras are compared to determine whether the cameras need to be updated. The determination manner is described above, and details are not described herein again. For example, the user is in the living room at first, and the first camera is the camera 31a of the smart TV 31. When the user enters the study room from the living room, the camera for video acquisition is switched from the camera of the smart TV 31 to the camera 30a of the desktop computer 30 in the study room.

In addition, when it is detected that the user moves from a first region (for example, the living room) to a second region (for example, the bedroom), in addition to switching the camera for photographing, other devices may be further switched. For example, the display unit is switched from a display unit (for example, a display screen of the smart TV 31) in the first region to a display unit (for example, the desktop computer 30 in the study room) in the second region, so that content displayed by the display unit before the switch is continuously displayed by the switched display unit. The microphone is also switched from a microphone in the first region to a microphone in the second region, so that the voice of the user is continuously acquired through the microphone in the second region. Other components may alternatively be performed, which are not listed in detail and not limited in this embodiment of the present invention.

The videos acquired by the plurality of cameras are sent to the electronic device 100, synthesized according to a time stamp, and then sent to the peer end electronic device, or saved locally to the electronic device 100. The videos acquired by at least two cameras may be further optimized by the electronic device 100 for seamless switching.

The foregoing video acquisition process may be applied to video calls, or may be applied to video photographing, and other scenarios where video acquisition is required. This is not limited in this embodiment of the present invention. In a specific implementation process, the electronic device 100 may alternatively control a plurality of cameras to photograph videos (the plurality of cameras may be determined based on scores or user selection), so that videos of the to-be-photographed content from a plurality of angles can be obtained simultaneously.

Similarly, in the smart home system, all electronic devices may be main control devices, or some electronic devices may be main control devices and some other electronic devices may be controlled devices. The foregoing steps may be performed on the electronic device 100, or may be performed on the server.

In the related art, if follow-up photographing is required, the user is often required to hold a photographing device to track movement of a to-be-photographed object, which easily causes the handheld photographing device to shake, resulting in technical problems such as shaking and blurring of photos. Based on the foregoing solution, follow-up photographing with a handheld photographing device is not required, and a different photographing device is switched to when the to-be-photographed object moves to a different location, which resolves the technical problem of poor photographing quality because the user needs to hold the photographing device for follow-up photographing.

Figure 8:
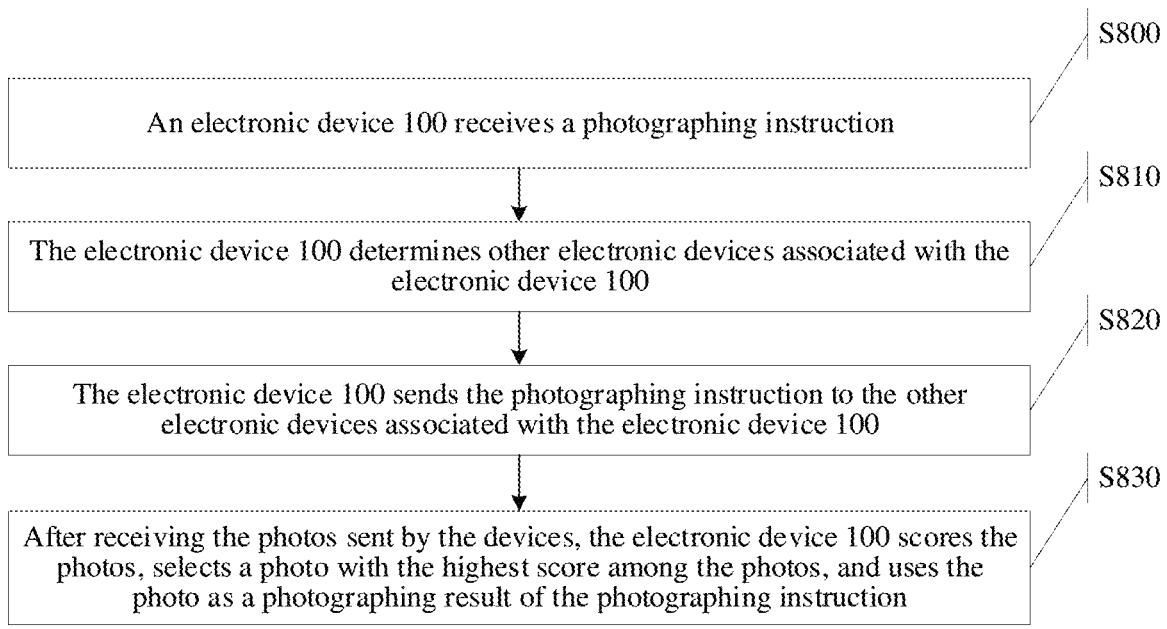
FIG. 8 is a flowchart of a control method according to another embodiment of the present invention.

Another embodiment of the present invention provides a method for photographing an image. The method may be applied to a server or an electronic device 100. The electronic device 100 is an electronic device included in a smart home scenario. The smart home scenario is, for example, the smart home scenario shown in FIG. 3. Referring to FIG. 8, the method for photographing an image includes the following steps:

S800: An electronic device 100 receives a photographing instruction. The photographing instruction is described in detail above, and details are not described herein again.

S810: The electronic device 100 determines other electronic devices associated with the electronic device 100. In a specific implementation process, the electronic device 100 may determine electronic devices bound to the electronic device 100 in various manners, three of which are listed below for description. Certainly, in a specific implementation process, the present invention is not limited to the following three cases:

In the first case, the electronic device 100 queries a router connected to the electronic device 100 for other electronic devices connected to the router, and the electronic devices are the electronic devices associated with the electronic device 100.

In the second case, the electronic device 100 queries the server for electronic devices bound with the same account as the electronic device 100, and the electronic devices are the electronic devices associated with the electronic device 100.

In the third case, the electronic device 100 sends broadcast information through short-range communication (for example, Bluetooth or WI-FI direct connection). Other electronic devices generate response information based on the broadcast information. The electronic device 100 uses the electronic devices that generate the response information as the electronic devices associated with the electronic device 100.

S820: The electronic device 100 sends the photographing instruction to the other electronic devices associated with the electronic device 100; and after receiving the photographing instruction, the electronic devices acquire photos of the to-be-photographed content, and then send the photos to the electronic device 100.

The electronic device 100 may send the photographing instruction to the other electronic devices associated with the electronic device 100 remotely or through a local area network.

The electronic device 100 may send the photographing instruction to all or some of the electronic devices associated with the electronic device 100. Some electronic devices may be determined in various manners. Several manners are listed below for description. Certainly, in a specific implementation process, the present invention is not limited to the following cases.

In the first case, after obtaining the photographing instruction, the electronic device 100 may first determine location information of the to-be-photographed content corresponding to the photographing instruction, and then determine an electronic device for photographing based on the location information. For example, the photographing instruction is "take a picture of the living room for me". After obtaining the photographing instruction, the electronic device 100 first determines that the to-be-photographed object is located in the living room through semantic analysis. In this case, the electronic device 100 first determines electronic devices located in the living room from the electronic devices bound to the electronic device 100, and then sends the photographing instruction to the electronic devices, thereby acquiring a photo of the living room. In another example, the photographing instruction is "take a picture for me". The electronic device 100 may first obtain location information of other electronic devices through the positioning apparatus, and then send the photographing instruction to electronic devices whose distances from the electronic device 100 are within a preset distance range. The preset distance is, for example, 10 m or 20 m, which is not limited in this embodiment of the present invention.

In the second case, the electronic device 100 may determine to-be-photographed content in the photographing instruction; determine a photographing mode based on the to-be-photographed content; and determine some electronic devices based on the photographing mode.

For example, if the photographing instruction is a voice instruction, the electronic device 100 may first recognize the voice instruction, and then perform semantic analysis based on recognized content, thereby determining that the to-be-photographed content is a person, a landscape, a still life, or the like. For example, if the photographing instruction is "take a picture for me", the to-be-photographed content includes a person; if the photographing instruction is "take a picture of the bedroom", the to-be-photographed content includes a still life; if the photographing instruction is "take a picture of the scene in front of you", the to-be-photographed content is a landscape, or the like.

If the to-be-photographed content includes a "person", the determined photographing mode is, for example, a portrait mode or a large aperture mode. If the to-be-photographed content is a "landscape", the determined photographing mode is, for example, a landscape mode. If the determined photographing mode is the portrait mode, the electronic device 100 may query other electronic devices for electronic devices in the portrait mode, to determine the electronic devices as electronic devices for photographing; and if the determined photographing mode is the landscape mode, the electronic device 100 may query other electronic devices for electronic devices in the landscape mode, to use the electronic devices as electronic devices for photographing, and so on. Alternatively, the electronic device 100 pre-stores photographing modes of the electronic devices, and then directly performs a query based on the pre-stored photographing modes of the electronic devices, to determine electronic devices for photographing.

Optionally, when the electronic device 100 sends the photographing instruction to the selected electronic devices, the photographing instruction may carry the photographing modes. For example, if the to-be-photographed content corresponding to the photographing instruction includes a "person", the photographing mode is the portrait mode. The electronic devices that receive the photographing instruction use the portrait mode to acquire photos, and send the photos to the electronic device 100. If the to-be-photographed content corresponding to the photographing instruction is a landscape, the photographing mode may be the landscape mode. The electronic devices that receive the photographing instruction use the landscape mode to acquire photos, and send the photos to the electronic device 100. When an electronic device that receives the photographing instruction has a plurality of cameras, the electronic device may photograph images through some of the cameras, or may photograph images through all the cameras. This is not limited in this embodiment of the present invention.

In addition, if the electronic devices that receive the photographing instruction do not have a corresponding photographing mode, a photographing mode that is closest to the corresponding photographing mode is used to take a picture (for example, when the photographing instruction stipulates that the photographing mode is the portrait mode, but the electronic devices that receive the photographing instruction do not have the portrait mode, the large aperture mode may be selected for photographing), or a favorite photographing mode of the user of the electronic device 100 is used to take a picture (for example, a default photographing mode or the most frequently used photographing mode in history).

S830: After receiving the photos sent by the devices, the electronic device 100 scores the photos, selects a photo with the highest score among the photos, and uses the photo as a photographing result of the photographing instruction. If the electronic device 100 includes a camera, the electronic device 100 also acquires a photo through the camera, and then scores the photo together with the photos acquired by other electronic devices, to obtain a photo with the highest score. A specific manner of determining the scores of the photos is described in detail subsequently.

After determining the photo with the highest score from the photos sent by the plurality of devices, the electronic device 100 may directly output the photo as the photographing result of the camera application. For example, the photo is stored in a photo album of the electronic device 100, or the photo is displayed on a photo preview interface of the photographing application. The electronic device 100 may alternatively process the finally determined photo before outputting the photo. For example, the photo is cropped to make the size meet a size requirement of the electronic device 100, picture beautification processing (adjusting hue, saturation, or brightness, adding a picture beautification filter, or the like) is performed on the photo, or various special effects are added to the photo.

Alternatively, if the photographing instruction is a photographing instruction sent by another electronic device (for example, an in-vehicle navigator). After obtaining a photo, the electronic device 100 may send the obtained photo to the car in-vehicle navigator. Before sending the photo to the in-vehicle navigator, the electronic device 100 may further obtain a screen size or a screen ratio of the in-vehicle navigator, to adjust the photo adaptively based on the screen size or the screen ratio.

Alternatively, after acquiring photos, other electronic devices perform picture beautification processing on or add various special effects to the photos before sending the photos to the electronic device 100. This is not limited in this embodiment of the present invention.

Alternatively, after determining the photo with the highest score, the electronic device 100 may send the photo to another electronic device for beautification processing. The electronic device sends the photo to the electronic device 100 after the beautification processing. For example, although the mobile phone 38 has strong computing functions, the mobile phone does not have a picture beautification application. After determining the photo with the highest score, the electronic device 100 may further determine whether the other electronic devices have the picture beautification application. If an electronic device (for example, the PAD32) has the picture beautification application, the electronic device 100 may send the photo to the PAD32 for picture beautification processing, and then receive a photo after the picture beautification processing by the PAD32. After obtaining the photo with the highest score, the electronic device 100 may query each bound device whether the picture beautification application is installed, or may prestore queried functions possessed by the electronic devices. After obtaining the photo with the highest score, an electronic device with the picture beautification application is directly determined through the functions possessed by the electronic devices.

In an optional embodiment, after the photos are scored and the photo with the highest score is determined based on S830, the electronic device that photographed the photo may be controlled to continuously perform photographing, and other electronic devices may be controlled to be in a turn-off state. Alternatively, other electronic devices may be kept in a turn-on state. This is not limited in this embodiment of the present invention.

Figure 9:
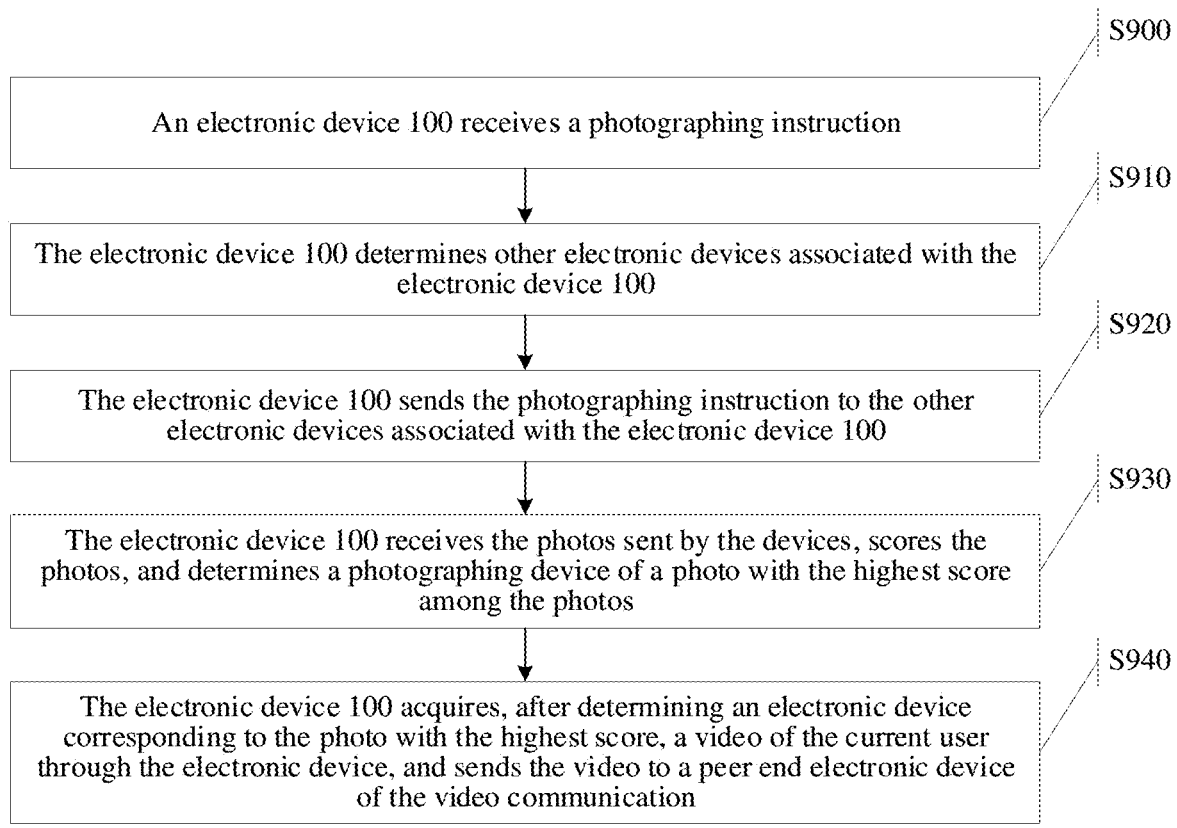
FIG. 9 is a flowchart of a control method according to another embodiment of the present invention.

Another embodiment of the present invention provides a control method. Referring to FIG. 9, the method includes the following steps:

S900: An electronic device 100 receives a photographing instruction.

The photographing instruction is, for example, an instruction for video photographing, and a manner of generating the photographing instruction is similar to that in S800, and details are not described herein again.

S910: The electronic device 100 determines other electronic devices associated with the electronic device 100. This step is similar to S81*o*, and details are not described herein again.

S920: The electronic device 100 sends the photographing instruction to the other electronic devices associated with the electronic device 100. This step is similar to S920, and details are not described herein again.

S930: The electronic device 100 receives the photos sent by the devices, scores the photos, and determines a photographing device of a photo with the highest score among the photos. This step is similar to S930, and details are not described herein again.

S940: The electronic device 100 acquires, after determining an electronic device corresponding to the photo with the highest score, a video of the current user through the electronic device, and sends the video to a peer end electronic device of the video communication.

For example, the user of the electronic device 100 starts the instant messaging application to communicate with a peer end user, and clicks a video call button simultaneously. After detecting the operation of clicking the video call button by the user, the electronic device 100 analyzes that the user of the electronic device 100 wishes to photograph a video and provide the video to the peer end electronic device. The electronic device 100 searches for electronic devices within a preset distance range, acquires photos through the electronic devices and cameras of the electronic device 100, and then determines an electronic device corresponding to a photo with the highest score as an electronic device for video communication. The determined electronic device for video communication may be the electronic device 100, or may be another electronic device.

For example, the electronic device 100 determines that a photo acquired by the smart TV 31 has the highest score. In this case, the electronic device 100 determines that the smart electronic device 31 is an electronic device for video communication, and when performing video communication with the peer end electronic device, sends a video acquired by the smart TV 31 to the peer end electronic device.

After determining an acquisition device of the photo with the highest score, the electronic device 100 may control the acquisition device to be in the turn-on state to acquire video data and send the video data to the electronic device 100. The electronic device 100 then send the video data to the peer end electronic device to implement video communication. In addition, other electronic devices may be controlled to be in the turn-on state or the turn-off state. This is not limited in this embodiment of the present invention.

In an optional embodiment, after the electronic device determines the acquisition device of the photo with the highest score, the acquisition device is always used to acquire videos for video communication in this video communication process. In another optional embodiment, after the electronic device determines the acquisition device of the photo with the highest score, if the user or the acquisition device is displaced, another electronic device may be re-determined as an acquisition device for video communication. The another electronic device may be determined in various manners. Two manners are listed below for description. Certainly, in a specific implementation process, the present invention is not limited to the following two cases.

In the first case, other electronic devices are controlled to be always in the enabled state. Photos are acquired through the electronic devices every preset time interval (for example, 10s, 20s, or 1 min). The photos acquired by the electronic devices and a photo acquired by the acquisition device are scored. If the photo acquired by the acquisition device still has the highest score, the device is still used as an acquisition device. If there is a photo acquired by another device that has a score higher than the score of the photo acquired by the acquisition device, the corresponding electronic device is set as a new acquisition device.

In the second case, the electronic devices other than the acquisition device are controlled to be in a photographing stop state. A motion amount of the acquisition device and a motion amount of the to-be-photographed object are detected every preset time interval (for example, 20s or 1 min). When the motion amount of the acquisition device is greater than a preset motion amount (for example, 5 m or 7 m), or the motion amount of the to-be-photographed object is greater than the preset motion amount, or a relative motion amount of the to-be-photographed object to the acquisition device is greater than the preset motion amount, the other electronic devices are controlled to be in a photographing state to acquire photos. In addition, scores of the photos acquired by the electronic devices are compared. When the photo acquired by the acquisition device still has the highest score, the device is still used as an acquisition device. In a case that there is a photo acquired by another device that has a score higher than the score of the photo acquired by the acquisition device, the corresponding electronic device is used as a new acquisition device. For example, when the user walks from the living room to the study room, the acquisition device automatically switches from the smart TV 31 in the living room to the desktop computer 30 in the study room.

The videos acquired by the smart TV 31 and the desktop computer 30 (or other acquisition devices) are sent to the electronic device 100, synthesized according to a time stamp, and then sent to the peer end electronic device. The videos acquired by the two video acquisition devices may be further optimized by the electronic device 100 for seamless switching.

The foregoing video acquisition control process may be applied to video calls, or may be applied to video photographing, and other scenarios where video acquisition is required. This is not limited in this embodiment of the present invention.

The manners of scoring the photos photographed by the electronic devices are described below.

In the first manner, in a case that a photo includes a character, a score of the photo may be calculated by the following formula:

$$E=\alpha x+\beta y+\gamma z \qquad (1),$$

where

E represents the score of the photo;

a distance parameter (x) uses a best photographing distance of 50 cm in a physical distance as a maximum value, a gradient of which decreases towards the farther or nearer, and α represents a weight value of the distance parameter (x) and has a value range of [0, 1];

an angle parameter (y) uses an angle facing a camera as a maximum value, a deflection gradient of which to a three-axis angle decreases, and β represents a weight value of the angle parameter (y) and has a value range of [0, 1]; and an aesthetic composition parameter (z) uses a maximum score of an aesthetic composition scoring model as a maximum value, a gradient of which decreases, and γ represents a weight value of the aesthetic composition parameter (z) and has a value range of [0, 1].

According different photographed objects, different weight coefficients may alternatively be assigned to the three parameters. For example, in a scenario mode of photographing a character, a slightly higher weight is assigned to the angle parameter, for example, β=0.5, γ=0.3, and α=0.2. For example, in a scenario of photographing an object, more attention is paid to the clarity of photographing, so that a higher weight is given to the distance parameter, for example, α=0.4, β=0.3, and γ=0.3. Certainly, other weight values may alternatively be used. This is not limited in this embodiment of the present invention.

A distance between each electronic device and the to-be-photographed object may be calculated through a computer vision technology. For example, in a case that an electronic device includes a binocular camera, a distance between the electronic device and the to-be-photographed object may be determined through a visual difference between the two cameras photographing the to-be-photographed object. Alternatively, in a case that the to-be-photographed object is the current user, the current user may be located through a handheld electronic device of the current user, and the other electronic devices may be located through positioning apparatuses of the other electronic devices. A distance between an electronic device and the to-be-photographed object may be determined based on positioning. In addition, a distance between another electronic device and the electronic device 100 may be further obtained based on a Bluetooth indoor positioning technology, a wireless WI-FI positioning technology, or an infrared optical positioning technology.

Key points of the face may be detected by using a face key point detection technology (for example, a corner detection algorithm Harris). After the key points of the face are detected, a three-axis angle of the face is estimated based on the key points of the face through a pose estimation algorithm. An angle parameter within a face range of the user (for example, a pitch angle, a yaw angle, and a roll angle are all within −30° to 30°) is a maximum value.

The aesthetic composition parameter (z) may be calculated through an aesthetic quality assessment algorithm, which generally includes two stages: (1) feature extraction stage, in which features may be manually designed, for example, features of a photo may be manually marked through clarity contrast, brightness contrast, color simplicity, harmony, or a degree of compliance with the rule of thirds; or image aesthetic features may be automatically extracted through a deep convolutional neural network; and (2) decision stage. The decision stage refers to training extracted image aesthetic features into a classifier or a regression model, to classify or regress the image. The trained model may distinguish images into high-quality aesthetic images and low-quality aesthetic images, and may further give images aesthetic quality scores. Commonly used methods include a naive Bayes classifier, a support vector machine, a deep classifier, and the like. An aesthetics scoring system may be set locally on the electronic device 100. An aesthetics evaluation algorithm is built-in through the aesthetics scoring system, or the aesthetics evaluation algorithm may be set in the server. This is not limited in this embodiment of the present invention.

Figure 10:
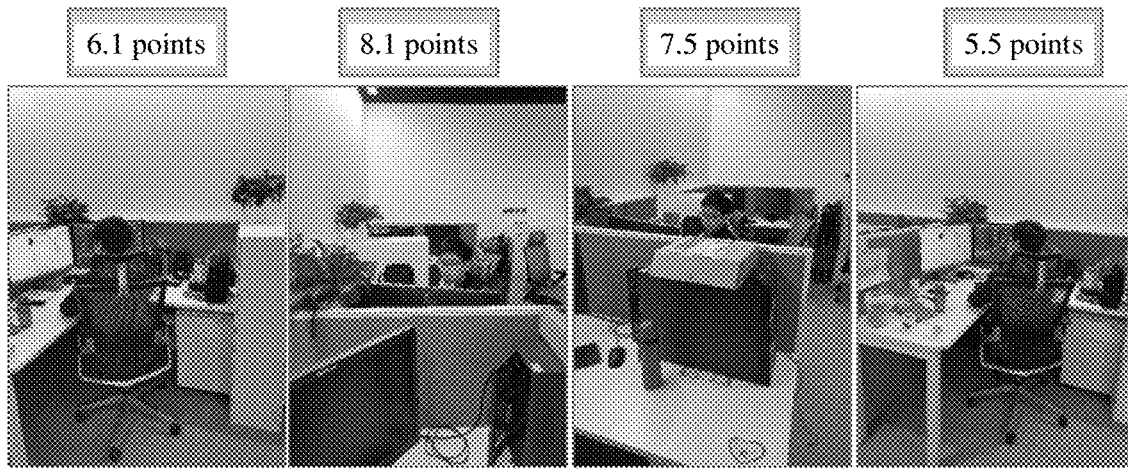
FIG. 10 is a schematic diagram of photos acquired by different cameras according to an embodiment of the present invention.

FIG. 10 shows scores of photos acquired by using different cameras based on the foregoing formula (1). As can be seen from FIG. 10, the scores of the photos that include the face are higher than that of the photos that do not include the face. In addition, in a case that both photos include the face, the photo closer to the camera has a higher score.

A "person" is included in the photographing instruction of the electronic device 100, and the electronic device 100 may determine whether the "person" is included in photos acquired by the cameras through pose recognition. If a photo includes the person, the photo may be scored based on the foregoing formula (1); otherwise the photo may be directly removed without scoring. Alternatively, the electronic device 100 may determine whether the face of the "person" is included in the photos acquired by the cameras through face recognition. If a photo includes the face, the photo is scored based on the foregoing formula (1); otherwise the photo may be directly removed without scoring.

In the second manner, in a case that a photo does not include the user, a score of the photo is calculated by the following formula:

$$E=\alpha x+\gamma z \qquad (2), \text{where}$$

E, $\alpha$, x, $\gamma$, and z are described in the foregoing formula (1), and details are not described herein again.

The electronic device 100 may select any of the foregoing manners to calculate the scores of the photos by default. In another embodiment, the electronic device 100 may alternatively select different calculation manners based on different to-be-photographed objects. For example, if a to-be-photographed object includes a character, the formula (1) is used to calculate a score of the photo. If the to-be-photographed object does not include a character, the formula (2) is used to calculate the score of the photo.

For other content, reference may be made to the descriptions of the foregoing related content, and details are not described herein again.

In a specific implementation process, the photos may alternatively be scored independently based on the foregoing parameters, for example, the photos may be scored independently based on distances, angles, or aesthetic composition.

Figure 11:
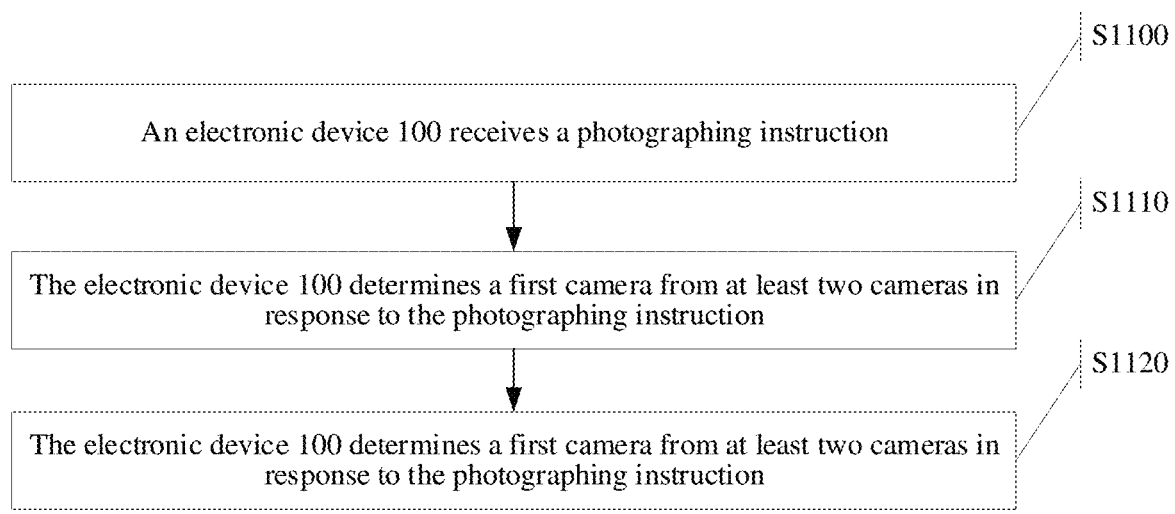
FIG. 11 is a flowchart of a control method according to another embodiment of the present invention.

Another embodiment of the present invention further provides a control method. Referring to FIG. 11, the method includes the following steps:

S1100: An electronic device 100 receives a photographing instruction, where the photographing instruction is similar to the photographing instruction described above, and details are not described herein again.

S1110: The electronic device 100 determines a first camera from at least two cameras in response to the photographing instruction, where the at least two cameras include a physical camera of the electronic device 100 and cameras of other electronic devices, there may be one or more physical cameras of the electronic device 100, and there may be one or more cameras of the other electronic devices.

In a specific implementation process, the electronic device 100 may determine the first camera in various manners. For example, a manner of determining the first camera includes: (1) determine location information of to-be-photographed content corresponding to the photographing instruction, and determine a camera for photographing based on the location information; and (2) determine a photographing mode based on the to-be-photographed content, and determine, based on the photographing mode, a camera including the photographing mode as the first camera. The specific manner of determining the first camera is described above, and details are not described herein again.

S1120: Acquire data corresponding to the photographing instruction through the first camera, where the data may be video data or image data.

In an implementation, the cameras (including the first camera) of the other electronic devices may be registered as virtual cameras of the electronic device 100 at the initial stage. In this way, in step S1220, a virtual camera corresponding to the first camera may be invoked to obtain data corresponding to the photographing instruction. In another implementation, the electronic device 100 may send the photographing instruction to an electronic device corresponding to the first camera. After the electronic device of the first camera acquires data in response to the photographing instruction, the data is returned to the electronic device 100.

In a specific implementation process, in addition to using the cameras collaboratively, the plurality of electronic devices may further use other functions collaboratively, for example, a microphone, a display screen, an input apparatus, and application software. For example, after an electronic device receives audio data, the audio data cannot be played because the microphone of the electronic device is damaged or there is no microphone. In this case, a microphone within a preset distance range may be selected for playback. In another example, when it is detected that the user selects an editing manner or a browsing manner of a file, not only editing manners or browsing manners of the current device can be provided to the user, editing manners or browsing manners of other electronic devices associated with the current device can be provided, and so on.

In the control method described in the embodiments of the present invention, the first electronic device may further utilize other functions of other electronic devices, for example, utilize software (for example, reading software, video playback software, or video processing software) or hardware (for example, a display or a microphone) of a second electronic device. When other functions of other electronic devices are used, the manner of determining other electronic devices (or corresponding hardware) is similar to the manner of determining cameras.

For example, the user of the first electronic device wants to play a video, and receives a photographing instruction. In response to the photographing instruction, the first electronic device determines that a current location is the living room, detects that the living room includes a smart TV (a second electronic device), and projects video content to the smart TV for playback. When the first electronic device determines the second electronic device, whether to use a display of the first electronic device or a display of the second electronic device may be comprehensively determined in consideration of a distance and an angle between the user and the first electronic device or the second electronic device, and sizes of the displays Based on the same invention concept, another embodiment of the present invention provides a control method, including:

obtaining, by a first electronic device, a photographing instruction;

determining location information of to-be-photographed content corresponding to the photographing instruction according to the photographing instruction, and determining, based on the location information of the to-be-photographed content, a camera at the most suitable location for photographing the to-be-photographed content from at least two cameras controllable by the first electronic device as a target camera; and/or determining a photographing mode based on the to-be-photographed content and according to the photographing instruction, and determining a camera including the photographing mode from at least two cameras controllable by the first electronic device as a target camera, where the at least two cameras include a camera on the first electronic device and a camera of a second electronic device, and the first electronic device is different from the second electronic device; and controlling, by the first electronic device, the target camera to execute the photographing instruction to obtain image data acquired by the target camera.

Optionally, the determining, based on the location information of the to-be-photographed content, a camera at the most suitable location for photographing the to-be-photographed content from at least two cameras controllable by the first electronic device as a target camera includes:

determining, based on the location information of the to-be-photographed content, a camera whose photographing range covers the location information from at least two cameras controllable by the first electronic device, and if only one camera is determined, determining the camera as the target camera;

or determining the photographing mode based on the to-be-photographed content, determining a camera including the photographing mode from at least two cameras controllable by the first electronic device, and if only one camera is determined, determining the camera as the target camera.

Optionally, the determining, based on the location information of the to-be-photographed content, a camera at the most suitable location for photographing the to-be-photographed content from at least two cameras controllable by the first electronic device as a target camera includes:

determining, based on the location information of the to-be-photographed content, a camera whose photographing range covers the location information from the at least two cameras controllable by the first electronic device, and if a plurality of cameras are determined, controlling the plurality of cameras to acquire photos, to obtain at least two photos; and scoring the at least two photos according to a first preset rule, and determining a camera corresponding to a photo with a highest score as the target camera; or determining the photographing mode based on the to-be-photographed content, determining a camera including the photographing mode from the at least two cameras controllable by the first electronic device, and if a plurality of cameras are determined, controlling the plurality of cameras to acquire photos, to obtain at least two photos; and scoring the at least two photos according to a first preset rule, and determining a camera corresponding to a photo with a highest score as the target camera.

Optionally, the controlling, by the first electronic device, the target camera to execute the photographing instruction to obtain image data acquired by the target camera includes:

sending, by the first electronic device, a photographing request to an electronic device where the target camera is located, and receiving the image data sent by the electronic device where the target camera is located; or invoking, by the first electronic device, the target camera as a virtual camera of the first electronic device, and obtaining the image data acquired by the virtual camera.

Optionally, the first preset rule includes:

at least one of a performance parameter of a camera, a distance between a camera and to-be-photographed content, or an angle between a camera and to-be-photographed content.

Optionally, a software architecture of the first electronic device includes: an application framework layer, including a camera framework configured to provide a camera function to the outside world; a camera interface, configured to obtain data acquired by cameras, the cameras including physical cameras and virtual cameras; an MSDP, configured to virtualize a camera of another electronic device as a virtual camera of the hardware abstraction layer; and a hardware abstraction layer, including cameras, where the cameras include physical cameras and virtual cameras, and the virtual cameras and the physical cameras have different tags. The invoking, by the first electronic device, the target camera as a virtual camera of the first electronic device includes:

pre-virtualizing the target camera as a virtual camera of the first electronic device;

invoking, by the first electronic device, a CaaS function, the CaaS function being invoked by the first electronic device through a CaaS service;

informing, by the first electronic device when a trigger condition is satisfied, a distributed device virtualization module MSDP to register a camera of another electronic device as a virtual camera of the hardware abstraction layer; and registering, by the first electronic device when a camera function of CaaS needs to be invoked, a CaaS service with the system, and querying, by the CaaS service, the MSDP whether a virtual camera exists, and when the virtual camera exists, obtaining, through a camera interface, video data of the virtual camera.

Based on the same invention concept, another embodiment of the present invention provides an electronic device, including:

one or more processors;

a memory;

a plurality of applications; and one or more computer programs, where the one or more computer programs are stored in the memory, the one or more computer programs include instructions, and when the instructions are executed by the first electronic device, the first electronic device performs the method according to any one of claims 1 to 7.

Based on the same invention concept, another embodiment of the present invention provides an electronic device, including:

a first obtaining module, configured to obtain a photographing instruction;

a first determining module, configured to determine location information of to-be-photographed content corresponding to the photographing instruction according to the photographing instruction, and determine, based on the location information of the to-be-photographed content, a camera at the most suitable location for photographing the to-be-photographed content from at least two cameras controllable by the first electronic device as a target camera; and/or determine a photographing mode based on the to-be-photographed content and according to the photographing instruction, and determine a camera including the photographing mode from at least two cameras controllable by the first electronic device as a target camera, where the at least two cameras include a camera on the first electronic device and a camera of a second electronic device, and the first electronic device is different from the second electronic device; and a control module, configured to control the target camera to execute the photographing instruction to obtain image data acquired by the target camera.

Optionally, the first determining module includes:

a first determining unit, configured to determine, based on the location information of the to-be-photographed content, a camera whose photographing range covers the location information from at least two cameras controllable by the first electronic device, and if only one camera is determined, determine the camera as the target camera;

or a second determining unit, configured to determine the photographing mode based on the to-be-photographed content; and a third determining unit, configured to determine a camera including the photographing mode from at least two cameras controllable by the first electronic device, and if only one camera is determined, determine the camera as the target camera.

Optionally, the first determining module includes:

a fourth determining unit, configured to determine, based on the location information of the to-be-photographed content, a camera whose photographing range covers the location information from the at least two cameras controllable by the first electronic device, and if a plurality of cameras are determined, control the plurality of cameras to acquire photos, to obtain at least two photos; a fifth determining unit, configured to score the at least two photos according to a first preset rule, and determine a camera corresponding to a photo with a highest score as the target camera; or a six determining unit, configured to determine the photographing mode based on the to-be-photographed content; a seventh determining unit, configured to determine a camera including the photographing mode from the at least two cameras controllable by the first electronic device, and if a plurality of cameras are determined, control the plurality of cameras to acquire photos, to obtain at least two photos; and an eighth determining unit, configured to score the at least two photos according to a first preset rule, and determining a camera corresponding to a photo with a highest score as the target camera.

Optionally, the control module is configured to:

send, by the first electronic device, a photographing request to an electronic device where the target camera is located, and receive the image data sent by the electronic device where the target camera is located; or invoke, by the first electronic device, the target camera as a virtual camera of the first electronic device, and obtain the image data acquired by the virtual camera.

Optionally, the first preset rule includes: at least one of a performance parameter of a camera, a distance between a camera and to-be-photographed content, or an angle between a camera and to-be-photographed content.

Optionally, the control module includes:

A software architecture of the first electronic device includes: an application framework layer, including a camera framework configured to provide a camera function to the outside world; a camera interface, configured to obtain data acquired by cameras, the cameras including physical cameras and virtual cameras; an MSDP, configured to virtualize a camera of another electronic device as a virtual camera of the hardware abstraction layer; and a hardware abstraction layer, including cameras, where the cameras include physical cameras and virtual cameras, and the virtual cameras and the physical cameras have different tags. The control module includes:

a virtualizing unit, configured to pre-virtualize the target camera as a virtual camera of the first electronic device;

an invoking unit, configured to invoke a CaaS function, the CaaS function being invoked by the first electronic device through a CaaS service;

a trigger unit, configured to inform, when a trigger condition is satisfied, a distributed device virtualization module MSDP to register a camera of another electronic device as a virtual camera of the hardware abstraction layer; and an obtaining unit, configured to register, when a camera function of CaaS needs to be invoked, a CaaS service with the system, and querying, by the CaaS service, the MSDP whether a virtual camera exists, and when the virtual camera exists, obtaining, through a camera interface, video data of the virtual camera.

Based on the same invention concept, another embodiment of the present invention provides a control method, including:

obtaining, by a first electronic device, a photographing instruction;

controlling, by the first electronic device in response to the photographing instruction, at least two cameras controllable by the first electronic device to execute the photographing instruction to obtain image data acquired by the target cameras, to obtain at least two photos; and determining, by the first electronic device, a photographing result of the photographing instruction according to a preset second rule and the at least two photos.

Optionally, the determining, by the first electronic device, a photographing result according to a preset second rule and the at least two photos includes:

scoring the at least two photos according to at least one of a performance parameter of a camera, a distance between a camera and to-be-photographed object, or an angle between a camera and to-be-photographed object; and using a photo that meets a preset score as the photographing result of the photographing instruction.

Optionally, the determining, by the first electronic device, a photographing result according to a preset second rule and the at least two photos includes:

stitching, by the first electronic device, the at least two photos as the photographing result of the photographing instruction; or outputting the at least two photos, and using a photo selected by the user as the photographing result of the photographing instruction in response to a selection operation of the user.

Based on the same invention concept, another embodiment of the present invention provides an electronic device, including:

one or more processors;

a memory;

a plurality of applications; and one or more computer programs, where the one or more computer programs are stored in the memory, the one or more computer programs include instructions, and when the instructions are executed by the first electronic device, the first electronic device performs the method according to any embodiment of the present invention.

Based on the same invention concept, another embodiment of the present invention provides an electronic device, including:

a second obtaining module, configured to obtain a photographing instruction;

a response module, configured to control, in response to the photographing instruction, at least two cameras controllable by the first electronic device to execute the photographing instruction to obtain image data acquired by the target cameras, to obtain at least two photos; and a second determining module, configured to determine a photographing result of the photographing instruction according to a preset second rule and the at least two photos.

Optionally, the second determining module includes:

a scoring unit, configured to score the at least two photos according to at least one of a performance parameter of a camera, a distance between a camera and to-be-photographed object, or an angle between a camera and to-be-photographed object; and a ninth determining unit, configured to use a photo that meets a preset score as the photographing result of the photographing instruction.

Optionally, the second determining module is configured to:

stitch, by the first electronic device, the at least two photos as the photographing result of the photographing instruction; or output the at least two photos, and use a photo selected by the user as the photographing result of the photographing instruction in response to a selection operation of the user.

Based on the same invention concept, another embodiment of the present invention provides a computer-readable storage medium, including instructions, where the instructions, when run on an electronic device, cause the electronic device to perform the method according to any embodiment of the present invention.

Based on the same invention concept, another embodiment of the present invention provides a computer program product, including software code, where the software code is configured to perform the method according to any embodiment of the present invention.

Based on the same invention concept, another embodiment of the present invention provides a chip including instructions, where the chip, when run on an electronic device, causes the electronic device to perform the method according to any embodiment of the present invention.

It may be understood that to implement the foregoing functions, the electronic device or the like includes hardware structures and/or software modules for performing the various corresponding functions. A person skilled in the art should be easily aware that, in combination with the units and algorithm steps of the examples described in the embodiments disclosed in this specification, the embodiments of this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the scope of the embodiments of the present invention.

In the embodiments of this application, functional module division may be performed on the electronic device according to the examples of the methods. For example, various functional modules may be divided according to the corresponding functions, or two or more functions may be integrated into one processing module. The integrated module is implemented in the form of hardware, or is implemented in the form of a software functional module. It should be noted that, in this embodiment of the present invention, the division of the modules is merely an example, and is merely division of logical functions. During actual implementation, there may be another division manner. The following descriptions are made by using an example in which function modules are divided corresponding to functions.

The methods provided in the embodiments of this application may be fully or partially implemented by software, hardware, firmware, or any combination thereof. When software is used for implementation, all or some of the embodiments may be implemented in the form of a computer program product. The computer program product includes one or more computer instructions. When the computer program instructions are loaded and executed on the computer, the procedures or functions according to the embodiments of this application are all or partially generated. The computer may be a general-purpose computer, a dedicated computer, a computer network, a network device, an electronic device, or other programmable apparatuses. The computer instructions may be stored in a computer-readable storage medium or transmitted from one computer-readable storage medium to another computer-readable storage medium. For example, the computer instructions may be transmitted from one website, computer, server or data center to another website, computer, server or data center in a wired (for example, a coaxial cable, an optical fiber or a digital subscriber line (digital subscriber line, DSL)) or wireless (for example, infrared, wireless or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a digital video disc (digital video disc, DVD)), a semiconductor medium (for example, SSD), or the like.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

A person skilled in the art may clearly understand that, for simple and clear description, for specific work processes of the foregoing described system, apparatus, and unit, reference may be made to corresponding processes in the foregoing method embodiments, and details are not described herein again.

In the embodiments provided in this application, it is to be understood that the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate parts may or may not be physically separate, and components displayed as units may or may not be physical units, that is, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of the embodiments of this application. Therefore, the protection scope of the embodiments of this application shall be subject to the protection scope of the claims.

What is claimed is:

1. A system, the system comprising:
    a first electronic device and a second electronic device, the first electronic device comprising a first camera and a second camera, and the second electronic device comprising a third camera, wherein:
    the first electronic device is configured to search for the second electronic device through short-range communication in a communication range;
    the first electronic device is configured to send a first request to the second electronic device;
    the second electronic device is configured to, in response to the first request, display a first button;
    the second electronic device is configured to receive a first operation of the first button by a user;
    the second electronic device is configured to, in response to the first operation, allow images acquired by the third camera to be sent to the first electronic device;
    the first electronic device is configured to display an image acquired by the first camera, an image acquired by the second camera, and an image acquired by the third camera in a first interface of a camera application;
    the first electronic device is configured to receive a second operation by the user on the first interface, where the second operation includes the user making a selection among the image acquired by the first camera, the image acquired by the second camera, and the image acquired by the third camera; and
    the first electronic device is configured to determine, based on the second operation, to acquire a video by the first camera and the third camera simultaneously.

2. The system according to claim 1, wherein the second operation comprises selecting the image acquired by the first camera in the first interface.

3. The system according to claim 2, wherein the second operation further comprises selecting the image acquired by the third camera in the first interface.

4. The system according to claim 1, wherein the second electronic device being configured to, in response to the first operation, allow the images acquired by the third camera to be sent to the first electronic device, comprises:
    the second electronic device being configured to, in response to the first operation, send confirmation information to the first electronic device; and
    the first electronic device configured to, in response to the confirmation information, register the third camera as a virtual camera.

5. The system according to claim 1, wherein the image acquired by the first camera, the image acquired by the second camera, and the image acquired by the third camera are stitched in the first interface.

6. The system according to claim 1, wherein the image acquired by the first camera, the image acquired by the second camera, and the image acquired by the third camera are displayed simultaneously in the first interface.

7. The system according to claim 1, wherein:
    the first electronic device is configured to acquire a video by the first camera and the third camera simultaneously; and
    the first electronic device is configured to save the video to the first electronic device.

8. The system according to claim 7, wherein:
    the first electronic device is configured to, prior to saving the video to the first electronic device, synthesize the image acquired by the first camera and the image acquired by the third camera.

9. The system according to claim 8, wherein in the video acquired by the first camera and the third camera, the image acquired by the first camera and the image acquired by the third camera are stitched.

10. The system according to claim 7, wherein the first electronic device being configured to acquire the video by the first camera and the third camera simultaneously comprises:
    the first electronic device being configured to, in response to a photographing instruction obtained by the first electronic device, use the first camera and the third camera simultaneously to acquire a video.

11. The system according to claim 1, wherein:
    the first electronic device is a mobile phone, the first camera is a front camera of the first electronic device ,and the second camera is a rear camera of the first electronic device; and
    the second electronic device is a mobile phone, and the third camera is a front camera or a rear camera of the second electronic device.

12. The system according to claim 1, wherein the short-range communication comprises Bluetooth or WI-FI.

13. The system according to claim 1, wherein:
    the first electronic device is configured to turn off the second camera when using the first camera and the third camera to acquire a video.

14. The system according to claim 1, wherein:
    the first electronic device is configured to re-determine to use the second camera and the third camera to acquire a video after using the first camera and the third camera to acquire a video.

15. The system according to claim 14, wherein re-determining, by the first electronic device, to use the second camera and the third camera to acquire the video comprises:
    calculating, by the first electronic device, a score value of images acquired by each of the first camera, the second camera and the third camera using a formula; and
    re-determining, by the first electronic device, to use the second camera and the third camera to acquire a video according to the score value; and
    wherein the formula comprises: $E=\alpha x+\gamma z$, wherein E represents a score of a photo, a distance parameter x uses a best photographing distance of 50 cm in a physical distance as a maximum value, a gradient of which decreases towards farther or nearer, and a represents a weight value of the distance parameter x and has a value range of [0,1], and an aesthetic composition parameter z uses a maximum score of an aesthetic composition scoring model as a maximum value, a gradient of which decreases, and y represents a weight value of the aesthetic composition parameter z and has a value range of [0,1].

16. The system according to claim 1, wherein:
when using the first camera and the third camera to acquire the video, the first electronic device is configured to prompt the user of photographing parameters of the first camera, wherein the photographing parameters comprise a photo size, an exposure, or a photographing mode.

17. The system according to claim 1, wherein:
the first electronic device configured to, when using the first camera and the third camera to acquire a video, use a microphone of the first electronic device or the second electronic device to acquire voice.

18. The system according to claim 1, wherein:
the first electronic device configured to, when using the first camera and the third camera to acquire the video, stop using the third camera to acquire the video, and use the first camera and a fourth camera simultaneously to acquire a video, wherein the fourth camera is a camera other than the third camera in the second electronic device; or
the first electronic device configured to, when using the first camera and the third camera to acquire the video, stop using the first camera to acquire the video, and use the second camera and the third camera simultaneously to acquire the video.

19. A control method, comprising:
searching, by a first electronic device, for a second electronic device through short-range communication in a communication range, the first electronic device comprising a first camera and a second camera, the second electronic device comprising a third camera;
sending, by the first electronic device, a first request to the second electronic device;
in response to the first request, displaying, by the second electronic device, a first button;
receiving, by the second electronic device, a first operation of the first button by a user;
in response to the first operation, allowing, by the second electronic device, images acquired by the third camera to be sent to the first electronic device;
displaying, by the first electronic device, an image acquired by the first camera, an image acquired by the second camera, and an image acquired by the third camera in a first interface of a camera application;
receiving, by the first electronic device, a second operation by the user on the first interface, wherein the second operation includes the user making a selection among the image acquired by the first camera, the image acquired by the second camera, and the image acquired by the third camera; and
based on the second operation, determining, by the first electronic device, to acquire a video by the first camera and the third camera simultaneously.

20. An electronic device, comprising:
one or more processors;
a first camera and a second camera;
a memory;
a plurality of applications; and
one or more computer programs, wherein the one or more computer programs are stored in the memory, the one or more computer programs comprise instructions, and when the instructions are executed by the electronic device, the electronic device is caused to:
search for a second electronic device through short-range communication in a communication range, wherein the second electronic device comprises a third camera;
send a first request to the second electronic device;
receive, from the second electronic device, images acquired by the third camera;
display an image acquired by the first camera, an image acquired by the second camera, and an image acquired by the third camera in a first interface of a camera application;
receive a second operation by the user on the first interface, wherein the second operation includes the user making a selection among the image acquired by the first camera, the image acquired by the second camera, and the image acquired by the third camera; and
based on the second operation, determine to acquire a video by the first camera and the third camera simultaneously.

* * * * *

UNITED STATES PATENT AND TRADEMARK OFFICE
CERTIFICATE OF CORRECTION

PATENT NO. : 11,991,441 B2
APPLICATION NO. : 17/757673
DATED : May 21, 2024
INVENTOR(S) : Jiang et al.

It is certified that error appears in the above-identified patent and that said Letters Patent is hereby corrected as shown below:

In the Claims

In Column 35, in Claim 15, Line 3, delete "and a" and insert -- and $\alpha$ --.

In Column 35, in Claim 15, Line 8, delete "and y" and insert -- and $\gamma$ --.

Signed and Sealed this
Eighteenth Day of June, 2024

Katherine Kelly Vidal
*Director of the United States Patent and Trademark Office*